United States Patent

Flowers et al.

(10) Patent No.: US 10,891,628 B1
(45) Date of Patent: Jan. 12, 2021

(54) USING COGNITIVE COMPUTING TO IMPROVE RELATIONSHIP PRICING

(71) Applicant: STATE FARM MUTUAL AUTOMOBILE INSURANCE COMPANY, Bloomington, IL (US)

(72) Inventors: Elizabeth Flowers, Bloomington, IL (US); Puneit Dua, Bloomington, IL (US); Alan Zwilling, Downs, IL (US); Adam Mattingly, Normal, IL (US); Melissa Attig, Bloomington, IL (US); Reena Batra, Alpharetta, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 697 days.

(21) Appl. No.: 15/499,205

(22) Filed: Apr. 27, 2017

Related U.S. Application Data

(60) Provisional application No. 62/436,899, filed on Dec. 20, 2016, provisional application No. 62/436,883, (Continued)

(51) Int. Cl.
*G06Q 30/00* (2012.01)
*G06Q 10/06* (2012.01)
(Continued)

(52) U.S. Cl.
CPC .............. *G06Q 30/016* (2013.01); *G06N 5/04* (2013.01); *G06Q 10/063112* (2013.01); *G06Q 30/0226* (2013.01)

(58) Field of Classification Search
None
See application file for complete search history.

(56) References Cited

U.S. PATENT DOCUMENTS

| 5,945,653 | A | * | 8/1999 | Walker | G06Q 20/341 |
| | | | | | 235/375 |
| 6,185,543 | B1 | * | 2/2001 | Galperin | G06Q 40/025 |
| | | | | | 705/38 |

(Continued)

FOREIGN PATENT DOCUMENTS

WO  WO2009134817 A1  11/2009

OTHER PUBLICATIONS

U.S. Appl. No. 15/498,740, filed Apr. 27, 2017, Flowers et al., "Optimizing Interest Accrual Between a User's Financial Accounts".
(Continued)

*Primary Examiner* — Akosua Kyereme-Tuah
(74) *Attorney, Agent, or Firm* — Lee & Hayes, P.C.

(57) ABSTRACT

Techniques are disclosed utilizing cognitive computing to assess customer value and provide specific promotional campaigns based upon this assessed value. Users may opt in to a rewards program. With user permission or affirmative consent, user behavioral data may be monitored that may be relevant to the user's relationship as a customer with a particular business and may include various indications of the users' behaviors, actions, and/or preferences. This data may be stored as part of each user's behavioral profile, the contents of which may be analyzed to determine which customers are more profitable to the business than others. Each user may be assigned a customer value indicative of his or her individual profitability, which may be used to provide specific promotional campaigns in an attempt to maintain the more profitable customers and to improve the profitability of others.

21 Claims, 5 Drawing Sheets

Related U.S. Application Data filed on Dec. 20, 2016, provisional application No. 62/341,677, filed on May 26, 2016, provisional application No. 62/338,749, filed on May 19, 2016, provisional application No. 62/338,752, filed on May 19, 2016, provisional application No. 62/332,226, filed on May 5, 2016.

(51) Int. Cl.
*G06Q 30/02* (2012.01)
*G06N 5/04* (2006.01)

(56) References Cited

U.S. PATENT DOCUMENTS

| | | |
|---|---|---|
| 6,341,353 B1 | 1/2002 | Herman et al. |
| 6,450,407 B1 | 9/2002 | Freeman et al. |
| 6,571,279 B1 | 5/2003 | Herz et al. |
| 6,611,811 B1 | 8/2003 | Deaton et al. |
| 6,719,197 B2 | 4/2004 | Yajima |
| 6,839,682 B1 | 1/2005 | Blume et al. |
| 6,954,732 B1 | 10/2005 | DeLapa et al. |
| 7,089,503 B1* | 8/2006 | Bloomquist ........... G06Q 40/00 705/38 |
| 7,472,088 B2 | 12/2008 | Taylor et al. |
| 7,617,156 B1 | 11/2009 | Wolfson |
| 7,771,278 B1 | 8/2010 | Muskin |
| 7,873,571 B1 | 1/2011 | Wehmer |
| 8,364,522 B1 | 1/2013 | Gevelber |
| 8,655,726 B1 | 2/2014 | Favero et al. |
| 8,744,946 B2 | 6/2014 | Shelton |
| 2002/0073043 A1 | 6/2002 | Herman et al. |
| 2002/0138343 A1 | 9/2002 | Weatherford et al. |
| 2002/0138346 A1 | 9/2002 | Kodaka et al. |
| 2003/0061097 A1 | 3/2003 | Walker et al. |
| 2003/0158844 A1 | 8/2003 | Kramer et al. |
| 2003/0182191 A1 | 9/2003 | Oliver et al. |
| 2003/0212595 A1 | 11/2003 | Antonucci |
| 2003/0229585 A1 | 12/2003 | Butler |
| 2004/0015395 A1 | 1/2004 | Acosta |
| 2004/0056101 A1 | 3/2004 | Barkan et al. |
| 2004/0088221 A1 | 5/2004 | Katz et al. |
| 2004/0117300 A1 | 6/2004 | Jones et al. |
| 2004/0122736 A1 | 6/2004 | Strock et al. |
| 2005/0159996 A1 | 7/2005 | Lazarus et al. |
| 2006/0111978 A1 | 5/2006 | Tietzen et al. |
| 2006/0143079 A1* | 6/2006 | Basak ................ G06Q 30/0207 705/14.1 |
| 2006/0242011 A1 | 10/2006 | Bell et al. |
| 2007/0050258 A1 | 3/2007 | Dohse |
| 2007/0094134 A1* | 4/2007 | Kalra ..................... G06Q 40/12 705/40 |
| 2007/0106558 A1 | 5/2007 | Mitchell et al. |
| 2007/0192183 A1 | 8/2007 | Monaco et al. |
| 2007/0198354 A1 | 8/2007 | Senghore et al. |
| 2007/0244741 A1 | 10/2007 | Blume et al. |
| 2008/0004888 A1 | 1/2008 | Davis et al. |
| 2008/0059307 A1 | 3/2008 | Fordyce, III et al. |
| 2008/0071700 A1 | 3/2008 | Catalano-Johnson |
| 2008/0077487 A1 | 3/2008 | Davis et al. |
| 2008/0086365 A1 | 4/2008 | Zollino et al. |
| 2008/0086426 A1 | 4/2008 | Dilip et al. |
| 2008/0103887 A1 | 5/2008 | Oldham et al. |
| 2008/0248815 A1 | 10/2008 | Busch |
| 2008/0313092 A1 | 12/2008 | Lanham et al. |
| 2009/0006183 A1 | 1/2009 | Paintin et al. |
| 2009/0037264 A1 | 2/2009 | Del Favero et al. |
| 2009/0112707 A1 | 4/2009 | Weiss et al. |
| 2009/0164382 A1 | 6/2009 | Sally |
| 2009/0164420 A1 | 6/2009 | Srivastava |
| 2009/0276368 A1 | 11/2009 | Martin et al. |
| 2009/0299865 A1 | 12/2009 | Budgen |
| 2010/0106644 A1 | 4/2010 | Annan et al. |
| 2010/0161379 A1 | 6/2010 | Bene et al. |
| 2010/0211431 A1 | 8/2010 | Lutnick et al. |
| 2010/0228604 A1* | 9/2010 | Desai ................. G06Q 30/0202 705/7.31 |
| 2011/0060808 A1 | 3/2011 | Martin et al. |
| 2011/0093324 A1 | 4/2011 | Fordyce, III et al. |
| 2011/0270661 A1 | 11/2011 | Heiser, II et al. |
| 2012/0010932 A1 | 1/2012 | Satyavolu et al. |
| 2012/0016817 A1 | 1/2012 | Smith et al. |
| 2012/0078706 A1 | 3/2012 | Rajagopalan |
| 2012/0084177 A1* | 4/2012 | Tanaka ............... G06Q 30/0613 705/26.41 |
| 2013/0054334 A1 | 2/2013 | Ross et al. |
| 2013/0124281 A1* | 5/2013 | Evans ................. G06Q 30/0213 705/14.13 |
| 2013/0166386 A1 | 6/2013 | Simmons |
| 2013/0166445 A1 | 6/2013 | Isaacson et al. |
| 2013/0191195 A1 | 7/2013 | Carlson et al. |
| 2013/0191213 A1 | 7/2013 | Beck et al. |
| 2013/0238413 A1 | 9/2013 | Carlson et al. |
| 2013/0253983 A1* | 9/2013 | Lawton .............. G06Q 30/0201 705/7.31 |
| 2013/0254035 A1 | 9/2013 | Ramer et al. |
| 2014/0085180 A1 | 3/2014 | Bender et al. |
| 2014/0129322 A1 | 5/2014 | George et al. |
| 2014/0156396 A1 | 6/2014 | deKozan et al. |
| 2014/0244470 A1 | 8/2014 | Aron |
| 2014/0274307 A1 | 9/2014 | Gonzalez |
| 2014/0279015 A1 | 9/2014 | Root et al. |
| 2014/0344019 A1* | 11/2014 | Thalken ............. G06Q 30/0202 705/7.31 |
| 2015/0134511 A1 | 5/2015 | Ghosh et al. |
| 2015/0186871 A1 | 7/2015 | Laracey |
| 2015/0220999 A1 | 8/2015 | Thornton et al. |
| 2015/0261986 A1 | 9/2015 | Ekbatani et al. |
| 2017/0178189 A1 | 6/2017 | Hu et al. |
| 2017/0255998 A1 | 9/2017 | Ameriks et al. |
| 2017/0323345 A1 | 11/2017 | Flowers et al. |

OTHER PUBLICATIONS

U.S. Appl. No. 15/498,772, filed Apr. 27, 2017, Flowers et al., "Preventing Account Overdrafts and Excessive Credit Spending".
U.S. Appl. No. 15/498,828, filed Apr. 27, 2017, Flowers et al., "Customizing Loan Specifics on a Per-User Basis".
U.S. Appl. No. 15/498,872, filed Apr. 27, 2017, Flowers et al., "Using Cognitive Computing to Provide Targeted Offers for Preferred Products to a User via a Mobile Device".
U.S. Appl. No. 15/499,061, filed Apr. 27, 2017, Flowers et al., "Predicting When a User is in Need of a Loan and Notifying the User of Loan Offers".
U.S. Appl. No. 15/499,089, filed Apr. 27, 2017, Flowers et al., "Using Cognitive Computing to Provide a Personalized Banking Experience".
U.S. Appl. No. 15/499,150, filed Apr. 27, 2017, Flowers et al., "Using Cognitive Computing to Improve Relationship Pricing".
U.S. Appl. No. 15/499,203, filed Apr. 27, 2017, Flowers et al., "Using Cognitive Computing for Presenting Targeted Loan Offers".
Office Action for U.S. Appl. No. 15/498,772, dated Oct. 11, 2019, Flowers, et al., "Optimizing Interest Accrual Between a User's Financial Accounts", 39 pages.
Office Action for U.S. Appl. No. 15/499,061, dated Oct. 21, 2018, Flowers, et al., "Using Cognitive Computing to Provide a Personalized Banking Experience", 15 pages.
Office Action for U.S. Appl. No. 15/498,872, dated Nov. 16, 2018, Flowers, et al., "Cognitive Computing for Generating Targeted Offers to Inactive Account Holders", 17 pages.
Office Action for U.S. Appl. No. 15/498,740, dated Nov. 29, 2019, Flowers, et al., "Preventing Account Overdrafts and Excessive Credit Spending", 33 Pages.
Office Action for U.S. Appl. No. 15/498,828, dated Dec. 26, 2018, Flowers, et al., "Using Cognitive Computing to Provide Targeted Offers for Preferred Products to a User via a Mobile Device", 16 pages.
Office Action for U.S. Appl. No. 15/499,150, dated Feb. 14, 2020, Flowers, et al., "Using Cognitive Computing for Presenting Targeted Loan Offers", 16 pages.

(56) References Cited

OTHER PUBLICATIONS

Office Action for U.S. Appl. No. 15/498,872, dated Feb. 24, 2020, Flowers, et al., "Cognitive Computing for Generating Targeted Offers to Inactive Account Holders", 16 pages.

Office Action for U.S. Appl. No. 15/498,828, dated Feb. 27, 2020, Flowers, et al., "Using Cognitive Computing to Provide Targeted Offers for Preferred Products to a User via a Mobile Device", 15 pages.

Office Action for U.S. Appl. No. 15/499,203, dated Feb. 5, 2020, Flowers, et al., "Customizing Loan Specifics on a Per-User Basis", 19 pages.

Office Action for U.S. Appl. No. 15/498,772, dated Apr. 8, 2019, Flowers, et al., "Optimizing Interest Accrual Between a User's Financial Accounts", 31 pages.

Office Action for U.S. Appl. No. 15/498,872, dated May 2, 2019, Flowers, et al., "Cognitive Computing for Generating Targeted Offers to Inactive Account Holders", 16 pages.

Office Action for U.S. Appl. No. 15/498,828, dated May 6, 2018, Flowers, et al., "Using Cognitive Computing to Provide Targeted Offers for Preferred Products to a User via a Mobile Device", 15 pages.

Office Action for U.S. Appl. No. 15/499,150, dated Jul. 22, 2019, Flowers, et al., "Using Cognitive Computing for Presenting Targeted Loan Offers", 13 pages.

Office Action for U.S. Appl. No. 15/499,203, dated Jul. 22, 2019, Flowers, "Customizing Loan Specifics on a Per-User Basis," 19 pages.

Office Action for U.S. Appl. No. 15/498,872, dated Sep. 12, 2019, Flowers, et al., "Cognitive Computing for Generating Targeted Offers to Inactive Account Holders", 16 pages.

Office Action for U.S. Appl. No. 15/499,089, dated Sep. 12, 2019, Flowers et al., "Predicting When a User Is in Need of a Loan and Notifying the User of Loan Offers," 18 pages.

Office Action for U.S. Appl. No. 15/498,828, dated Sep. 17, 2019, Flowers, et al., "Using Cognitive Computing to Provide Targeted Offers for Preferred Products to a User via a Mobile Device", 16 pages.

Bigne, et al., "The impact of internet user shopping patterns and demographics on consumer mobile buying behaviour" Journal of Electronic Commerce Research, vol. 6, No. 3, Jan. 2005, 18 Pages.

Final Office Action dated Apr. 27, 2020 for U.S. Appl. No. 15/499,061 "Using Cognitive Computing to Provide a Personalized Banking Experience" Flowers, 21 pages.

Non Final Office Action dated Apr. 6, 2020 for U.S. Appl. No. 15/499,089 "Predicting When a User Is in Need of a Loan and Notifying the User of Loan Offers" Flowers, 18 pages.

Final Office Action dated May 22, 2020 for U.S. Appl. No. 15/498,740 "Preventing Account Overdrafts and Excessive Credit Spending" Flowers, 39 pages.

Non Final Office Action dated Jun. 12, 2020 for U.S. Appl. No. 15/499,150 "Using Cognitive Computing for Presenting Targeted Loan Offers" Flowers, 17 pages.

Non Final Office Action dated Jun. 5, 2020 for U.S. Appl. No. 15/499,203 "Customizing Loan Specifics on a Per-User Basis" Flowers, 24 pages.

\* cited by examiner

USING COGNITIVE COMPUTING TO IMPROVE RELATIONSHIP PRICING

CROSS REFERENCE TO RELATED APPLICATIONS

This application claims priority to (1) Provisional Application No. 62/338,749, entitled "Using Cognitive Computing To Customize Loans," filed on May 19, 2016; (2) Provisional Application No. 62/332,226, entitled "Using Cognitive Computing To Provide a Personalized Banking Experience," filed on May 5, 2016; (3) Provisional Application No. 62/338,752, entitled "Using Cognitive Computing To Provide a Personalized Banking Experience," filed on May 19, 2016; (4) Provisional Application No. 62/341,677, entitled "Using Cognitive Computing To Improve Relationship Pricing," filed on May 26, 2016; (5) Provisional Application No. 62/436,899, entitled "Using Cognitive Computing To Improve Relationship Pricing," filed on Dec. 20, 2016; and (6) Provisional Application No. 62/436,883, entitled "Preventing Account Overdrafts and Excessive Credit Spending," filed on Dec. 20, 2016, each of which is incorporated herein by reference in its entirety.

TECHNICAL FIELD

The present disclosure relates to evaluating a customer's value and, more particularly, to using cognitive computing and/or predictive modeling to assess customer value and to leverage customer value for the customization of promotional campaigns.

BACKGROUND

Many different types of businesses provide services for their customers as part of an ongoing relationship. In some cases, these relationships may be mandated via contractual agreements, while in other cases these relationships may be cultivated and maintained through other means. For example, many businesses attempt to provide one-on-one services or consultations, or invest in specific promotional campaigns targeted towards specific customers (e.g., long-time customers or new customers) to strengthen their relationships. As a result, businesses may invest significant time, effort, and money as part of their efforts to promote new customer relationships and maintain existing ones.

However, because each customer is somewhat unique, using the same promotional campaigns or incentives for each customer tends to be effective for only that portion of customers for whom the campaign style or incentives happen to align. Identifying whether campaigns are effective for particular customers can also be difficult as this often requires gathering feedback manually, which is time consuming and labor intensive. Thus, knowledge of a customer's value is a useful tool as it may allow businesses to incentivize customers of a higher assessed value than others, but businesses may not be able to determine a customer's value from this feedback. Therefore, accurately assessing customer value is useful to businesses but doing so presents several challenges.

BRIEF SUMMARY

In one aspect, a computer-implemented method for customizing a service provider campaign based upon a customer's value may be provided. The method may include one or more processors (1) receiving user behavioral data associated with a user and indicative of the user's behavior; (2) generating a user behavioral profile for the user based upon the user behavioral data, the user behavioral profile including behavioral traits relevant to the user's role as a customer with a service provider with whom the user has an ongoing relationship; (3) calculating the user's customer value with the service provider by assessing behavioral traits included in the user's behavioral profile and their correlation to a measure of value for the service provider; (4) ranking the user's customer value within a scale of customer values ranging between a first level of value to the service provider and a second level of value to the service provider, the first level of value being less than the second level of value; and/or (5) linking the user to a respective commercial communication supported by the service provider based upon the ranked user's customer value within the scale of customer values. The method may include additional, less, or alternate steps, including those discussed elsewhere herein.

In yet another aspect, a system for customizing a service provider campaign based upon a customer's value may be provided may be provided. The system may include (1) one or more computing devices configured to collect and transmit user behavioral data associated with a user and indicative of the user's behavior; and (2) one or more back-end components configured to (i) generate a user behavioral profile for the user based upon the user behavioral data, the user behavioral profile including behavioral traits relevant to the user's role as a customer with a service provider with whom the user has an ongoing relationship; (ii) calculate the user's customer value with the service provider by assessing behavioral traits included in the user's behavioral profile and their correlation to a measure of value for the service provider; (iii) rank the user's customer value within a scale of customer values ranging between a first level of value to the service provider and a second level of value to the service provider, the first level of value being less than the second level of value; and/or (iv) link the user to a respective commercial communication supported by the service provider based upon the ranked user's customer value within the scale of customer values. The system may include additional, less, or alternate components, including those discussed elsewhere herein.

In still another aspect, a non-transitory tangible computer-readable medium for customizing a campaign based upon a user's customer value may be provided. The non-transitory tangible computer-readable medium may include instructions executable by one or more processors that, when executed by the one or more processors, causes the one or more processors to (1) receive user behavioral data associated with a user and indicative of the user's behavior; (2) generate a user behavioral profile for the user based upon the user behavioral data, the user behavioral profile including behavioral traits relevant to the user's role as a customer with a service provider with whom the user has an ongoing relationship; (3) calculate the user's customer value with the service provider by assessing behavioral traits included in the user's behavioral profile and their correlation to a measure of value for the service provider; (4) rank the user's customer value within a scale of customer values ranging between a first level of value to the service provider and a second level of value to the service provider, the first level of value being less than the second level of value; and/or (5) link the user to a respective commercial communication supported by the service provider based upon the ranked user's customer value within the scale of customer values. The non-transitory tangible computer-readable medium may include additional, less, or alternate instructions, including those discussed elsewhere herein.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

The Figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

The present aspects relate to, inter alia, using cognitive computing and/or predictive modeling to assess a customer's value and to provide customized promotional campaigns based upon this assessment. To accomplish this, user behavioral data may be collected and stored by one or more back-end components and used to construct a user behavioral profile. This behavioral data may be analyzed, such as with customer affirmative consent or opt-in to a rewards program, to identify various behavioral traits, for example, that may be relevant to the user's relationship with the business and include indications of the customer's value. For example, the customer value may be assessed in terms of how valuable or profitable the customer is compared to other customers.

The customer's value may also be assessed not only as a current assessment, but as a future value assessment. To facilitate future assessments of customer value, a predictive modeling function may be implemented that determines the statistical likelihood of the customer's value being within several different ranges in the future. From these different ranges, one associated with the highest statistical likelihood may be selected to determine the user's future assessed customer value.

Once the user's present and/or future customer value is determined, aspects include the business associating the user with a particular promotional campaign. Promotional campaigns may include, for example, specific targeted incentives that have been tailored to the user based upon his specific behavioral traits and/or customer value. This may include, for example, providing custom levels of rewards that are part of a rewards program, offering the customer a discounted price that is greater than prices offered to less valuable customers, providing the customer with other unique options that may not be available to less valuable customers, etc.

System Overview

Figure 1:
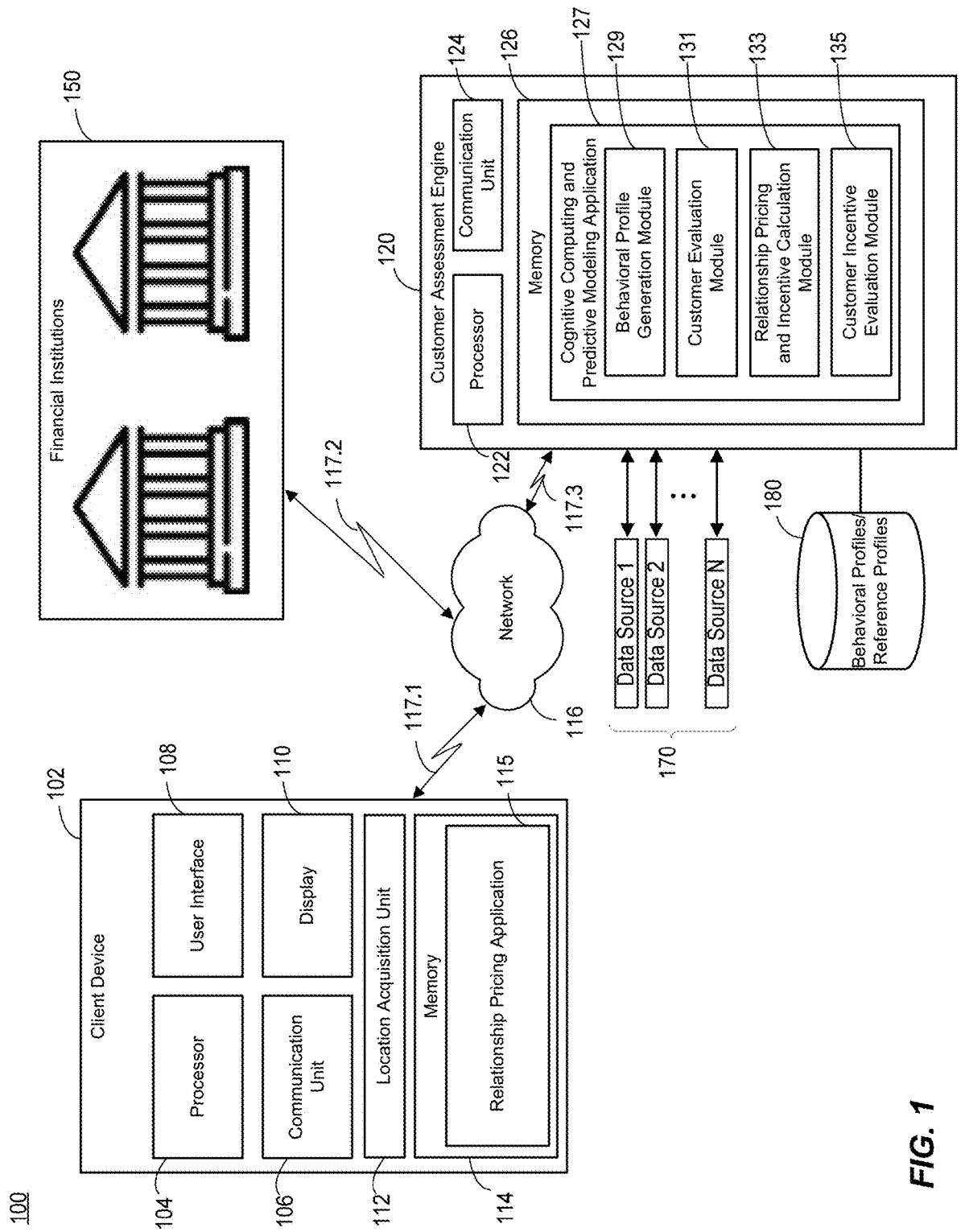
FIG. 1 is a block diagram of an exemplary customer assessment system 100 in accordance with one aspect of the present disclosure.

FIG. 1 is a block diagram of an exemplary customer assessment system 100 in accordance with an aspect of the present disclosure. In the present aspects, customer assessment system 100 may include one or more client devices 102, a customer assessment engine 120, one or more financial institutions 150, and a communication network 116. Customer assessment system 100 may include additional, less, or alternate components, including those discussed elsewhere herein.

For the sake of brevity, customer assessment system 100 is illustrated as including a single client device 102, a single customer assessment engine 120, two financial institutions 150, and a single communication network 116. However, the aspects described herein may include any suitable number of such components. For example, customer assessment engine 120 may communicate with several client devices 102, each of which may be operated by a separate user, to receive data from each separate client device 102 and/or to transmit data to each separate client device 102, as further discussed herein.

To provide another example, customer assessment engine 120 may receive data from one or more client devices 102 such that a behavioral profile for each user may include data received from each user's respective client device, as well as other devices not shown in FIG. 1 for purposes of brevity. To provide yet another example, client device 102 may represent one client device from several different client devices for the same user or for different users. For example, client device 102 may represent a user's smartphone as well as a user's desktop computer, each of which may collect and transmit data to one or more financial institutions 150 and/or customer assessment engine 120, as further discussed below.

Communication network 116 may be configured to facilitate communications between one or more client devices 102, one or more financial institutions 150, and/or customer assessment engine 120 using any suitable number of wired and/or wireless links, such as links 117.1-117.3, for example. For example, communication network 116 may include any suitable number of nodes, additional wired and/or wireless networks that may facilitate one or more landline connections, internet service provider (ISP) backbone connections, satellite links, public switched telephone network (PSTN), etc.

To facilitate communications between the various components of customer assessment system 100, the present aspects include communication network 116 being implemented, for example, as a local area network (LAN), a metropolitan area network (MAN), a wide area network (WAN), or any suitable combination of local and/or external network connections. To provide further examples, communications network 116 may include wired telephone and cable hardware, satellite, cellular phone communication networks, base stations, macrocells, femtocells, etc. In the present aspects, communication network 116 may provide one or more client devices 102 with connectivity to network services, such as Internet services, for example, and/or support application programming interface (API) calls between one or more client devices 102, one or more financial institutions 150, and/or customer assessment engine 120.

Client device 102 may be configured to communicate using any suitable number and/or type of communication protocols, such as Wi-Fi, cellular, BLUETOOTH, NFC, RFID, etc. For example, client device 102 may be configured to communicate with communication network 116 using a cellular communication protocol to send data to and/or receive data from one or more financial institutions 150 and/or customer assessment engine 120 via communication network 116 using one or more of links 117.1-117.3.

In various aspects, client device 102 may be implemented as any suitable communication device. For example, client device 102 may be implemented as a user equipment (UE) and/or client device, such as a smartphone, for example. To provide additional examples, client device 102 may be implemented as a personal digital assistant (PDA), a desktop computer, a tablet computer, a laptop computer, a wearable electronic device, etc.

As further discussed below, data collected and/or transmitted by client device 102 to one or more financial institutions 150 and/or customer assessment engine 120 may include, for example, any suitable or relevant information used by customer assessment engine 120 to track a location of client device 102 and/or to collect other types of information about users associated with client device 102 (such as with customer permission or affirmative consent), to generate a behavioral profile for one or more users using this collected data, and/or to assess a current and/or future customer value based upon data stored in each user's respective behavioral profile (or additional data that may be relevant for such purposes).

For example, client device 102 may collect, monitor, store, and/or transmit demographic information, data indicative of the user's behavior such as spending habits, where the user has shopped physically and/or online, data indicative of a user's preferences, data indicative of how long a user has had a relationship with a business, financial information such as account balances of one or more users associated with client device 102, online web browsing history, life event data, etc. This data is discussed in more detail below with reference to FIG. 2.

Furthermore, data received by client device 102 from customer assessment engine 120 may include any suitable information used to actively notify, enroll, or affect the user with regards to one or more user-specific campaigns. Additionally or alternatively, data received by client device 102 from customer assessment engine 120 may facilitate notifying or otherwise delivering to user specific incentives based upon the user's behavioral profile. For example, data received by client device 102 from customer assessment engine 120 may notify a user of available offers such as discounted pricing and/or bundled discounted services, coupons, specific promotional offers, notifications regarding specific details about how and why the customized promotional campaign details were calculated or otherwise selected for that user, etc.

For example, if it is determined by customer assessment engine 120 that a user associated with client device 102 is likely to soon terminate his relationship with the business, then client device 102 may display a notification transmitted via customer assessment engine 120 regarding offers of a specific type to incentivize the user to remain a customer. To provide another example, customer assessment engine 120 may calculate the assessed customer value of a user as among the 90th percentile of all customers. In such a case, then customer assessment engine 120 may calculate short-term prices that would ordinarily result in a loss of profit for other, less valuable customers, but in the long term will result in a return on investment for that particular customer due to his high customer value. Customer assessment engine 120 may then transmit or otherwise send this information to client device 102, which may in turn display the information for the user to incentivize the user to remain a valuable customer, inform the user how to take advantage of the promotional campaign, etc.

Detailed Operation of Customer Assessment System 100

In the present aspects, client device 102 may include one or more processors 104, a communication unit 106, a user interface 108, a display 110, a location acquisition unit 112, and a memory unit 114.

Communication unit 106 may be configured to facilitate data communications between client device 102 and one or more of communication network 116, one or more financial institutions 150, and/or customer assessment engine 120 in accordance with any suitable number and/or type of communication protocols. In the present aspects, communication unit 106 may be configured to facilitate data communications based upon the particular component and/or network with which client device 102 is communicating.

Such communications may facilitate the transmission of collected data from one or more client devices 102, which may be utilized by customer assessment engine 120 to generate a behavioral profile for one or more users and to access and analyze each user's behavioral profile to link or otherwise associate each user with a customized promotional campaign, the details of these operations are further discussed herein. In the present aspects, communication unit 106 may be implemented with any suitable combination of hardware and/or software to facilitate this functionality. For example, communication unit 106 may be implemented with any suitable number of wired and/or wireless transceivers, network interfaces, physical layers (PHY), ports, antennas, etc.

User interface 108 may be configured to facilitate user interaction with client device 102. For example, user interface 108 may include a user-input device such as an interactive portion of display 110 (e.g., a "soft" keyboard displayed on display 110), an external hardware keyboard configured to communicate with client device 102 via a wired or a wireless connection (e.g., a BLUETOOTH keyboard), an external mouse, or any other suitable user-input device.

Display 110 may be implemented as any suitable type of display that may facilitate user interaction, such as a capacitive touch screen display, a resistive touch screen display, etc. In various aspects, display 110 may be configured to work in conjunction with user-interface 108 and/or one or more processors 104 to detect user inputs upon a user selecting a displayed interactive icon or other graphic, to identify user selections of objects displayed via display 110, to display notifications regarding specific promotions, discounts, pricing, advertisements, or other materials relevant to that user's particular promotional campaign, which may be received, for example, via customer assessment engine 120.

Location acquisition unit 112 may be implemented as any suitable device configured to generate location data indicative of a current geographic location of client device 102. In an aspect, location acquisition unit 112 may be implemented as a satellite navigation receiver that works with a global navigation satellite system (GNSS) such as the global positioning system (GPS) primarily used in the United States, the GLONASS system primarily used in the Soviet Union, the BeiDou system primarily used in China, and/or the Galileo system primarily used in Europe.

Location acquisition unit 112 and/or one or more processors 104 may be configured to receive navigational signals from one or more satellites and to calculate a geographic location of client device 102 using these signals. Location acquisition unit 112 may include one or more processors, controllers, or other computing devices and memory to calculate the geographic location of client device 102 without one or more processors 104. Alternatively, location acquisition unit 112 may utilize components of one or more processors 104. Thus, one or more processors 104 and location acquisition unit 112 may be combined or be separate or otherwise discrete elements.

One or more processors 104 may be implemented as any suitable type and/or number of processors, such as a host processor for the relevant device in which client device 102 is implemented, for example. One or more processors 104 may be configured to communicate with one or more of communication unit 106, user interface 108, display 110, location acquisition unit 112, and/or memory unit 114 to send data to and/or to receive data from one or more of these components.

For example, one or more processors 104 may be configured to communicate with memory unit 114 to store data to and/or to read data from memory unit 114. In accordance with various embodiments, memory unit 114 may be a computer-readable non-transitory storage device, and may include any combination of volatile (e.g., a random access memory (RAM)), or a non-volatile memory (e.g., battery-backed RAM, FLASH, etc.). In the present aspects, memory unit 114 may be configured to store instructions executable by one or more processors 104. These instructions may include machine readable instructions that, when executed by one or more processors 104, cause one or more processors 104 to perform various acts.

In the present aspects, relationship pricing application 115 is a portion of memory unit 114 configured to store instructions, that when executed by one or more processors 104, cause one or more processors 104 to perform various acts in accordance with applicable aspects as described herein. For example, instructions stored in relationship pricing application 115 may facilitate one or more processors 104 performing functions such as periodically reporting and/or transmitting the location of client device 102 as part of a running background process (or causing location acquisition unit 112 to do so), collecting various types of data, sending various types of data to one or more financial institutions 150 and/or customer assessment engine 120, receiving data, promotional campaign information, and/or notifications from one or more financial institutions 150 and/or customer assessment engine 120, displaying promotional campaign information, notifications and/or other information using data received via one or more financial institutions 150 and/or customer assessment engine 120, etc.

In some aspects, relationship pricing application 115 may reside in memory unit 114 as a default application bundle that may be included as part of the operating system (OS) utilized by client device 102. But in other aspects, relationship pricing application 115 may be installed on client device 102 as one or more downloads, such as an executable package installation file downloaded from a suitable application source via a connection to the Internet or other suitable device, network, external memory storage device, etc.

For example, relationship pricing application 115 may be stored in any suitable portions of memory unit 114 upon installation of a package file downloaded in such a manner. Examples of package download files may include downloads via the iTunes store, the Google Play Store, the Windows Phone Store, a package installation file downloaded from another computing device, etc. Once downloaded, relationship pricing application 115 may be installed on client device 102 as part of an installation package such that, upon installation of relationship pricing application 115, memory unit 114 may store executable instructions such that, when executed by one or more processors 104, cause client device 102 to implement the various functions of the aspects as described herein.

In the present aspects, a user may initially register with a third party, business, service provider, etc., associated with customer assessment engine 120 by creating and/or submitting unique information that will be used to associate the user with his or her behavioral profile. For example, a user may, upon first launching relationship pricing application 115, complete a registration process via a website, via an API services call to customer assessment engine 120, over the phone, etc. This information may include, for example, the customer's demographic information, preferences, or any suitable information that may be useful in facilitating various portions of the aspects as described herein. For example, upon installing and launching relationship pricing application 115 on client device 102, a user may be prompted to enter login information and/or complete an initial registration process and submit this information.

Additionally or alternatively, relationship pricing application 115 may periodically request data directly from the user as opposed to collecting data in a passive manner. For example, relationship pricing application 115 may request certain types of information from the user as part of one or more surveys and/or questionnaires. This information may be requested, for example, upon an initial registration and/or at any suitable time after the initial registration. In this way, a user may be asked for certain types of information that may be difficult to obtain through third party data providers and/or public records. For example, a user may be asked about the ages of his family members, his current income level (or where his earnings fit within a range of earnings), his hobbies and interests, his or her preference for receiving communications (e.g., electronic versus paper), current social media platforms and/or networks that the user may actively participate (and any logon credentials for such platforms), etc.

An initial registration process may additionally or alternatively include, for example, obtaining the user's consent to track her location or to otherwise collect and utilize other types of data to provide the various customer assessments as discussed herein. For example, a user may opt in to allow customer assessment engine 120 to track and/or receive the user's financial account data including financial transactions, spending history, credit card balances, and/or account balances associated with the user's financial accounts at one or more financial institutions 150. To provide another example, a user may opt in to allow client device 102 to collect and/or transmit data to customer assessment engine 120, which may facilitate, for example, customer assessment engine 120 tracking and storing various types of data as part of the user's behavioral profile such as the user's web browsing history, social media behaviors, key words used online in various scenarios, etc. To provide additional examples, customer assessment engine 120, a user may provide authorization (e.g., online login credentials) to allow customer assessment engine 120 to access one or more of the user's accounts held at one or more financial institutions 150 and/or one or more social media network platforms.

In the present aspects, relationship pricing application 115 may provide different levels of functionality based upon options selected by a user and/or different implementations of relationship pricing application 115. For example, in some aspects, relationship pricing application 115 may facilitate client device 102 working in conjunction with one or more financial institutions 150 and/or customer assessment engine 120 to track data that may be relevant to the user's financial behaviors, but not location data or other data indicative of the user's social behaviors online. To provide another example, relationship pricing application 115 may facilitate client device 102 reporting data indicative of the user's social behaviors online but not data indicative of the user's financial behaviors. In this way, the present aspects of relationship pricing application 115 allow a user to specify the type and level of data tracking to address the concerns of different users.

One or more financial institutions 150 may include any suitable number and/or type of financial institutions that are associated with various financial accounts. For example, one or more financial institutions 150 may include banks, creditors, lenders, and/or brokers. One or more users (e.g., a user associated with client device 102) may hold one or more accounts with one or more financial institutions 150 such as checking accounts, savings accounts, credit accounts, lines of credit, loan accounts, charge accounts, money market accounts, brokerage accounts, etc. These accounts may be held at a single institution or spread out across several different financial institutions.

In the present aspects, financial accounts held at one or more financial institutions 150 may be accessible via a secure connection to communication network 116, for example, by client device 102 and/or customer assessment engine 120, such as via wireless communication or data transmission between computing devices over one or more radio frequency links or wireless communication channels. For example, one or more financial institutions 150 may provide online services that allow a user to access her accounts using client device 102 and/or another suitable computing device. Upon receipt of a valid authenticated request for various types of financial data, one or more financial institutions 150 may transmit the requested financial data to client device 102 and/or personalized loan engine 120. Examples of the financial data transmitted by one or more financial institutions 150 may include financial transaction data indicating previous credits and debits to a user's accounts, a current account balance, loan payoff balances, credit report history, credit scores, credit card utilization, derogatory credit marks, spending data such as the time, amount, and specific merchant for which previous account debits and/or charges were made, whether the user has previously defaulted on a particular loan, etc.

Customer assessment engine 120 may be affiliated or otherwise associated with one or more parties, which may be the same party or a different party than those affiliated with one or more financial institutions 150. For example, customer assessment engine 120 may be associated with one or more service providers that have an ongoing relationship with one or more users, with each user being associated with one or more client devices 102. Although referred to herein as "service providers," customer assessment engine 120 may be associated with any suitable type of business entity that, through an ongoing relationship with one or more users, attempts to make a profit. These business entities may include for example, businesses traditionally known as service providers as well as businesses that may provide goods and/or services. For example, business entities associated with customer assessment engine 120 may include any suitable business for which promotional campaigns described herein may be applicable, such as banks, lenders, insurance companies, retailers, consultants, utilities, subscription-based businesses, etc. As used herein, profit, or profitability, may refer to a financial gain earned by the business entities. The financial gain may be earned, or unearned, over a period of time. Accordingly, the profit may be the difference between the cost of providing a service, or producing a good, and the price at which a customer pays for the service or good. The cost of the good or service may include all, or some, of the expenses paid by the business entities in buying, operating, or producing the service or good.

In the present aspects, customer assessment engine 120 may include any suitable number of components configured to receive data from and/or send data to one or more of client devices 102 and/or one or more financial institutions 150 via communication network 116 using any suitable number of wired and/or wireless links. For example, customer assessment engine 120 may constitute a portion of (or the entirety of) one or more back-end components, and may be configured (alone or in conjunction with other back-end components) to execute one or more applications to perform one or more functions associated with the various aspects as discussed herein.

For example, as shown in FIG. 1, customer assessment engine 120 may communicate with one or more external computing devices such as servers, databases, database servers, web servers, etc. The present aspects include customer assessment engine 120 working in conjunction with any suitable number and/or type of back-end components to facilitate the appropriate functions of the aspects as described herein.

In the present aspects, customer assessment engine 120 may be implemented, for example, as any suitable number and/or type of servers configured to access data from one or more additional data sources and/or store data to one or more storage devices. For example, as shown in FIG. 1, additional data sources 170 may represent data that is made accessible by customer assessment engine 120 from any number N of data sources, such as third-party data providers or other data sources in addition to and/or including one or more financial institutions 150. Although not shown in FIG. 1 for purposes of brevity, customer assessment engine 120 may access data sources 170 directly and/or via one or more communication networks (e.g., via communication network 116) and/or via one or more radio links or wireless communication channels.

The data received via additional data sources 170 may be utilized by customer assessment engine 120 as part of the process of generating a personalized behavioral profile for each user, which may be stored in one or more suitable storage units (e.g., storage unit 180) along with other types of data, as further discussed below. Customer assessment engine 120 may access each user's profile as part of the execution of one or more cognitive computing and/or predictive modeling algorithms to calculate each user's assessed customer value. That is, customer assessment engine 120 may determine from various behavioral traits stored in a user's behavioral profile how profitable a user with such traits is to the service provider. Based upon a particular user's customer value, customer assessment engine 120 may determine a specific promotional campaign strategy to ensure that more effort is made to maintain and attract customers that exhibit the most profitable types of behavior.

To provide some illustrative examples, additional data sources 170 may include data mined from social media, data accessed via from one or more social media platforms using logon credentials supplied by the user, and/or user's web browsing habits (e.g., search terms and websites), data provided by various retailers, demographic data associated with other users in a particular region and/or associated with a particular retailer, income levels of various users, where different users commonly shop, assets associated with various users such as the cars each user owns, driving data associated with any vehicles each user owns, mortgage loan information associated with various users, how much users typically spend at various retailers, what money is typically spent on, user preferences regarding communications, how the user generally conducts business with the service provider (e.g., over the phone versus texting or emailing), etc.

To provide even more examples, additional data sources 170 may include data indicative of various user life events such as getting married, a birth of a child, a child about to attend (or currently attending) college, paying off a previous loan, receiving a settlement or inheritance, etc. Customer assessment engine 120 may utilize any portion of such data (as well as data from other data sources), which may be stored as part of user's behavioral profile, as input to one or more cognitive computing and/or predictive modeling algorithms to perform the assessments, predictions, statistical calculations, and/or promotional campaign identifications as discussed herein, some examples of which are further discussed below.

Customer assessment engine 120 may be implemented as any suitable number of computing devices (e.g., servers) that are configured to generate and/or store various behavioral profiles in storage unit 180. Each user's behavioral profile may include, for example, an aggregation of the aforementioned data, which may include behavioral traits that have been identified as relevant in the user's role as a customer with the service provider. The data in a user's behavioral profile may then be analyzed to determine how relevant certain behavioral traits are such that the customer's value may be assessed in a quantifiable way such as a numeric score, a grade, a percentile ranking among other customers, etc.

For example, a user's behavioral profile (as well as behavioral reference profiles, which are further discussed below) may include demographic data and/or other data indicative of various behavioral traits, any of which may be used to generate the user's behavioral profile. Again, to provide some illustrative examples, data indicative of the user's behavioral traits that are stored as part of the user's behavioral profile may include data indicative of the user's spending, the user's preference to receive information in a paperless manner, the user's social networking data, financial data (e.g., credit card utilization, credit card balances, bank account balances, etc.), the user's tracked location data, credit report data, credit scores, family or individual income, a likelihood that the user will terminate the relationship with the service provider, a length of the relationship between the user and the service provider, etc.

Each user's behavioral profile may be stored in storage unit 180 in any suitable manner such that personalized banking engine 120 may access and correlate each user's behavioral profile to a particular user. For example, each user's behavioral profile may be identified by a username that is used by one or more users in accordance with relationship pricing application 115, a first and last name of each user, logon credentials, etc. Furthermore, in aspects in which behavioral reference profiles are utilized to assess customer value (which are further discussed below), the reference behavioral data may likewise be stored in storage unit 180 in any suitable manner such that behavioral traits and/or attributes may be identified, matched to those of a user's behavioral profile, and/or be correlated to a particular tier, percentile, score, grade, etc., representative of the customer's value.

In the present aspects, customer assessment engine 120 may include one or more processors 122, a communication unit 124, and a memory unit 126. One or more processors 122, communication unit 124, and memory unit 126 may perform substantially similar functions as one or more processors 104, communication unit 106, and memory unit 114, respectively, of client device 102. Therefore, only differences between these components will be further discussed herein.

Of course, differences between components of customer assessment engine 120 and client device 102 may be owed to differences in device implementation rather than the functions performed by each individual component. For example, if customer assessment engine 120 is implemented as a server whereas client device 102 is implemented as a personal computing device, one or more processors 122 may have more processing power (e.g., a faster processor, more cores, etc.) than one or more processors 104, although one or more processors 122 may perform similar functions as one or more processors 104 (e.g., executing instructions stored in memory to perform various acts, processing data, etc.). Furthermore, in aspects in which cognitive computing is implemented; one or more processors 122 may be configured as one or more processors compatible with a cognitive computing system. For example, one or more processors 122 may form one of several nodes of a neural network, one or more portions of a cloud computing system, etc.

In the present aspects, customer assessment engine 120 may be configured to send or otherwise transmit various types of data to client device 102, such as notifications, campaign promotional materials, inquiries, requests, etc. This data may be sent, for example, from customer assessment engine 120 via communication unit 124, and may include any suitable number and/or type of data transmissions. For example, customer assessment engine 120 may transmit appropriate notifications and/or inquiries via emails, text messages, push notifications, etc., to client device 102.

Again, in various aspects, customer assessment engine 120 may acquire data from various sources to facilitate the various calculations and assessments described herein. Some of these sources may include data from secure connections or may otherwise require secure and/or authorized access. For example, one or more financial institutions 150 may provide access to one or more user's financial account data via any suitable authentication techniques, such as via a secure connection, password authentication, public and/or private key exchanges, biometric identification, etc.

Therefore, in the present aspects, customer assessment engine 120 may, when appropriate, implement any suitable techniques to obtain information in a legal and technically feasible manner. For example, as discussed above, a user may setup an account and/or profile with a party associated with customer assessment engine 120. As discussed above, the user may then opt in to data collection via the various data sources that are to be collected via customer assessment engine 120, and in return, the user may be provided with financial or other benefits. The user may additionally or alternatively provide authentication information for each account and/or data source for which data is to be accessed, collected, tracked, monitored, etc., such that customer assessment engine 120 may obtain any suitable type of data to carry out the aspects described herein.

Cognitive Computing

Cognitive computing may refer to systems that learn at scale, reason with purpose, and/or interact with humans naturally. Rather than being explicitly programmed, cognitive computing systems may learn and reason from their interactions and from their experiences with their environment. To achieve this, cognitive computing systems may derive new methods of operation or interaction with humans based upon analysis of historical data sets, real-time data, and/or near real-time data. The analysis performed by cognitive computing systems may occur automatically or at the direction of a human actor. As opposed to traditional computing systems, which are deterministic, cognitive computing systems are probabilistic. In other words, cognitive computing systems generate not just answers to numerical problems, but hypotheses, reasoned arguments, and recommendations about more complex and meaningful bodies of data. Cognitive computing systems may advantageously interpret and utilize data that is typically referred to as being unstructured in nature. This allows such systems to keep pace with the volume, complexity, and unpredictability of information and systems in the modern world. To do so, cognitive computing systems attempt to augment the reasoning and thought processes of the human brain.

Therefore, in various aspects, customer assessment engine 120 may be implemented as a computing device (or a constituent part of one or more computing devices) that is/are configured to process data in accordance with one or more cognitive computing techniques. For example, customer assessment engine 120 may be implemented as one or more nets or nodes of an artificial neural network system and/or other suitable system that models and/or mimics the reasoning and processing of the human brain. Thus, cognitive computing and predictive modeling application 127 may include one or more machine learning algorithms, code, logic, and/or instructions to facilitate the behavior, functionality, and/or processing of a cognitive computing system. Furthermore, one or more processors 122 may likewise be configured to provide processing functionality for the entirety of, or for one or more portions of, a cognitive computing-based system.

In the present aspects, cognitive computing and predictive modeling application 127 may include any suitable combination of functions as discussed herein. For example, as shown in FIG. 1, cognitive computing and predictive modeling application 127 may include a behavioral profile generation module 129, a customer evaluation module 131, a relationship pricing and incentive calculation module 133, and a customer incentive evaluation module 135. These modules are for illustrative purposes and represent examples of some of the functionality that may be performed by customer assessment engine 120 in accordance with a cognitive computing-based system. However, aspects include cognitive computing and predictive modeling application 127 including additional, less, or alternate functionality, including those discussed elsewhere herein. Furthermore, aspects include cognitive computing and predictive modeling application 127 implementing traditional, non-cognitive computing processes.

In one aspect, behavioral profile generation module 129 is a portion of memory unit 126 configured to store instructions, that when executed by one or more processors 122, cause one or more processors 122 to perform various acts in accordance with applicable embodiments as described herein. In the present aspects, instructions stored in behavioral profile generation module 129 may facilitate one or more processors 122 performing functions such as collecting, monitoring, tracking, mining, and/or storing data for any suitable number of users. For example, instructions stored in behavioral profile generation module 129 may facilitate customer assessment engine 120 providing the requested authorization to one or more financial institutions 150 and/or additional data sources 170 as needed, to receive data from one or more of these sources, and to store any suitable portion of this data as part of each user's respective behavioral profile.

In the present aspects, instructions stored in behavioral profile generation module 129 may facilitate customer assessment engine 120 aggregating and organizing received data into one or more behavioral profiles, which may then be stored in storage unit 180. For example, instructions stored in behavioral profile generation module 129 may facilitate one or more processors 122 identifying behavioral traits from a collected aggregation of data from various data sources that are relevant to the user's relationship with a particular service provider, and organizing these behavioral traits as part of a user's behavioral profile.

In other words, behavioral profile generation module 129 may facilitate customer assessment engine 120 filtering an aggregation of data from various sources and storing portions of collected data relevant to a particular service provider. For example, a user may have several behavioral profiles associated with different service providers, with each service provider assessing the customer's value in their own terms and based upon different behavioral traits. To provide a more illustrative example, location data may be relevant to a service provider such as an insurer, as it provides risk-based information from routes and geographic areas where the user commonly travels, which relates to insurance pricing. However, location data may not be relevant to other service providers such as banks, which may have more interest in the user's preferences for receiving electronic versus paper statements, as these types of behaviors save the bank money.

In the present aspects, behavioral profile generation module 129 may include instructions to facilitate the identification of any suitable number of relevant behavioral traits based upon one or more business rules and/or logical conditions. For example, behavioral profile generation module 129 may include instructions that identify relevant behavioral traits that are specified by the service provider, which may be known to be relevant and/or correlated with profitability. Over time, a service provider may change these traits or how they are identified and update the instructions stored in behavioral profile generation module 129 as desired. Additionally, the behavioral profile generation module 129, alone or in conjunction with any other module of the cognitive computing and predictive modeling application 127, may independently change these traits or how they are identified and update the instructions stored in the behavioral profile generation module 129. The behavioral profile generation module 129 may make these changes based upon an analysis of the collected data for any number of users. The behavioral profile generation module 129 may identify traits and correlations between data and users not identified, or contemplated, by the service provider. These traits and correlations may directly impact a customer's value to the service provider. In one aspect, customer evaluation module 131 is a portion of memory unit 126 configured to store instructions, that when executed by one or more processors 122, cause one or more processors 122 to perform various acts in accordance with applicable embodiments as described herein. In the present aspects, instructions stored in customer evaluation module 131 may facilitate one or more processors 122 assessing and/or evaluating a customer's value using data (e.g., behavioral traits) that are stored in a user's behavioral profile. That is, instructions stored in customer evaluation module 131 may facilitate customer assessment engine 120 calculating a customer's value for a particular service provider by assessing behavioral traits included in the user's behavioral profile and their correlation to a measure of profit for the service provider.

Additionally or alternatively, instructions stored in customer evaluation module 131 may facilitate customer assessment engine 120 ranking the user's customer value among other customers. This ranking may be commensurate with the specific type of customer value calculation that is performed. For example, the user's customer value may be placed within a scale of customer values ranging between a lowest level of profitability (e.g., the lowest percentile among the service provider's customers) and the highest level of profitability (e.g., the highest percentile among the service provider's customers). In this way, the calculated customer value may be expressed in terms relative to other customers and need not necessarily be (but may be) calculated as a precise numeric score.

Regardless of the techniques used to calculate customer value, which are discussed in further detail below, customer evaluation module 131 may facilitate customer assessment engine 120 learning which customer behavioral traits are relevant and/or correlated with higher levels of profitability. To do so, the present aspects include customer evaluation module 131 causing customer assessment engine 120 to determine which behavioral traits were previously correlated with higher levels of profitability among other customers. These other customers may be, for example, associated with the reference behavioral profiles stored in storage unit 180 (the details of which are further discussed below), for example, or may be associated with customers that have otherwise been identified by the service provider, or the cognitive computing and predictive modeling application 127, as being particularly valuable in terms of profitability.

In other words, customer evaluation module 131 may cause customer assessment engine 120 to identify a correlation between behavioral traits included in a user's behavioral profile to a measure of profit for the service provider. This correlation may be based on, for example, behavioral traits that were previously correlated with high levels of profitability among the service provider's other customers (e.g., customers in the 90th percentile of the service provider's most profitable customers).

To provide an illustrative example, a correlation may be made identified such that, from the service provider's pool of 100 customers, the 10 most valuable in terms of profitability are those that (1) prefer self-service online to customer service over the phone, (2) prefer electronic communications, and (3) maintain no credit card debt. As the service provider's pool of customers expands to 500, customer evaluation module 131 may cause customer assessment engine 120 to identify, from among the new 400 customers, those customers that have these matching behavioral traits stored in their respective behavioral profiles. Customer evaluation module 131 may then cause customer assessment engine 120 to calculate the customer value of each new user matching these preferable behavioral traits as being in the top ten percentile of the pool of 500 customers.

Additionally or alternatively, customer evaluation module 131 may cause customer assessment engine 120 to use the correlations between behavioral traits and profitability to the service provider as part of the calculation of the customer's value. To provide an illustrative example, as discussed above, correlations may be made between certain behavioral traits and their impact and relation regarding the service provider's profitability. In the present aspects, customer assessment engine 120 may perform this correlation with varying degrees of granularity, such that the presence of certain behavioral traits are identified as having a greater impact on increased profitability than others. In other words, the presence of some behavioral traits may be very likely to result in greater profitability to the service provider while the presence of others, although favorable, are less likely to do so.

Therefore, the present aspects include customer evaluation module 131 facilitating customer assessment engine 120 assigning or otherwise associating a weight to each behavioral trait relevant to the user's role as a customer with the service provider based upon each trait's correlation to profitability. That is, behavioral traits may be assigned a weight that indicates the particular relevance or correlation between the specific behavioral trait and its impact of service provider profitability. These weights may follow any suitable weighing system. For example, the weights may be selected as numeric weights with a greater weight indicating a greater correlation to profitability to the service provider.

Furthermore, behavioral traits may include more complex behaviors that may be more accurately represented in terms of a degree of behavior. In other words, while some behavioral traits may be viewed as either being present or absent, other types of behavioral traits may be more accurately viewed as having a degree of favorability regarding their impact on profitability. That is, the aforementioned weights may represent a correlation between behavioral traits and their impact on profitability, while a numeric value may be associated with the weighted behavioral trait to represent how favorable the particular user's actual behavior is towards profitability. In this way, numeric values assigned to particular behavioral traits may represent a degree of favorable behavior having a tendency to reduce costs for the service provider. Like the aforementioned weights, the values assigned to each user's behavioral traits may likewise follow any suitable system. For example, the numeric values may be assigned to each of the user's behavioral traits, with a larger numeric value indicating a greater degree of favorable behavior in terms of that particular behavioral trait's tendency to reduce costs for the service provider.

To provide an illustrative example using the previously identified behavioral traits, assume that a user (1) prefers self-service online to customer service over the phone, (2) prefers electronic communications, and (3) maintains no credit card debt. From an analysis of other customers, a correlation may be identified between each of these behaviors and service provider profitability. Therefore, customer assessment engine 120 may determine that preferring online service is highly correlated to saving the service provider money (i.e., it saves money otherwise spent for customer service labor), and therefore this behavior is assigned a weight of 3 on a weighting scale of 1-3. Furthermore, electronic communications may also save the service provider some money, but less than self-service behaviors. Therefore, this behavior may be assigned a weight of 2 on the same scale. Finally, maintaining no credit card debt may be a positive trait to have in a customer but not particularly well correlated to increasing service provider profits, and therefore may be assigned a weight of 1 on the same scale.

Continuing this example, assume that an analysis of the user's actual behavior with regards to the aforementioned behavioral traits reveals that the user, although indicating a preference for self-service online in his profile, actually called customer support once in the last year and used online self-service three times. Although the numeric values may be calculated in any suitable manner, the numeric value associated with this behavior may be calculated, in this example, as a ratio of how often the user exhibited this favorable trait. In this case, the behavioral trait could be assigned a numeric value of 7.5, to represent that the user typically exhibits favorable aspects of this trait (online help) 75% of the time.

Further continuing this example, now assume that an analysis of the user's actual behavior reveals that the user does solely rely on electronic communications and statements. Therefore the numeric value associated with this behavioral trait may be assigned a value of 10.0. And further assuming that the user maintained no credit card debt for 10 of the last 12 months, the numeric value associated with this behavioral trait may be assigned a value of 8.3 (10/12=83.33%).

Using the aforementioned weights and numeric values, the customer's value may then be calculated using a weighted average of these three behavioral traits, which reflects the importance of each trait as well as the degree of each type of behavior typically, exhibited by the user. In the present illustrative example, the customer's value would be calculated as shown in Equation 1 below:

Customer Value=[(Weight 1)×(Behavioral trait value 1)+(Weight 2)×(Behavioral trait value 2)+ (Weight 3)×(Behavioral trait value 3)]/Sum of Weights Eqn.1:

Customer Value=[(3)×(7.5)+(2)×(10)+(1)×(8.33)]/6

Customer Value=[22.5+20+8.3]/6

Customer Value=[50.83]/6

Customer Value=8.47

Or, in other words, out of a scale of 10 being the "best" or most profitable type of customer, a customer assessed in view of the aforementioned behaviors would rank 8.47/10.0. Again, any suitable number of behavioral traits, scales, ranking, and/or weighting systems may be used to calculate the customer's value such that a particular customer's value may be quantified with respect to that of other customers. This process may be repeated for any suitable number of customers for a particular service provider such that, from the pool of customer values, the most valuable customers may be delineated from less valuable customers.

As mentioned above, storage unit 180 may also store one or more reference behavioral profiles in addition to user behavioral profiles. In the present aspects, customer assessment engine 120 may use the one or more reference behavioral profiles to assess a customer's value by comparing the user's behavioral traits to that of other reference behavioral profiles, which may be associated with known customer values. For example, storage unit 180 may store reference behavioral profiles associated with "reference" users of different tiers, rankings, scores, grades, etc., that include behaviors that have been identified with various behavioral traits that are associated with known customer values. These reference behavioral profiles may be generated, for example, from an analysis of user behavior over time and their correlation and/or magnitude of influence over each customer's actual value in terms of profitability to the service provider. To provide another example, a service provider may identify certain behavioral traits that are desirable and assign customers that partake in such behaviors the highest level of customer value. In such a scenario, the reference behavioral profiles may represent service-provider defined behaviors with corresponding customer values that result from user's exhibiting behaviors matching these predefined behavioral traits. Additionally or alternatively, the desirable behavioral traits may be identified by the cognitive computing and predictive modeling application 127 without interaction from the service provider.

Therefore, in addition to accessing user behavioral profiles from data storage unit 180, customer assessment engine 120 may also access storage unit 180 to read data from these reference behavioral profiles and identify which reference behavioral profile best matches that of a particular user. For example, customer assessment engine 120 may identify which reference behavioral profiles has the most number of behavioral traits in common with a particular user's behavioral profile, and calculate the user's customer value as the known customer value associated with a matching behavioral profile. The details of these techniques are further discussed below with reference to FIG. 3.

Additionally or alternatively, the present aspects include assessing a user's customer value based upon a prediction of future values. In other words, because the user's behavioral traits and/or the impact of some behavioral traits upon the service provider's profit may change over time, the present aspects may compensate for these changes. To do so, one or more processors 122 may execute instructions stored in customer evaluation module 131 to execute any suitable number and/or type of predictive analytics. For example, customer assessment engine 120 may utilize the data received from various sources such as client device 102, one or more financial institutions 150, one or more additional data sources 170, and/or other data sources as inputs and/or parameters used in conjunction with a predictive modeling algorithm, a descriptive modeling algorithm, a decision modeling algorithm, machine learning or pattern recognition techniques, etc.

In doing so, customer assessment engine may calculate the user's current customer value taking into consideration these future changes, or the customer's value may be calculated exclusively in terms of future predictions. For example, one or more processors 122 may execute instructions stored in customer evaluation module 131 to execute a predictive modeling function, which uses one or more behavioral traits from the user's behavioral profile as inputs. Based upon these behavioral traits, changes in similar user's behaviors, and/or previous changes in certain behaviors and their impact over time upon profitability, the predictive modeling function may output a range of statistical likelihoods that a user's future customer value will fall into certain ranges.

To provide an illustrative example, assume that a customer's assessed value may be subdivided into various tiers, or ranges, of values. The subdivision of these ranges may be in accordance with any suitable granularity that may be driven, for example, by the service provider's needs. In the following example, assume that four ranges of customer values are used. Continuing this example, the predictive modeling function may output, for each subdivided range of customer values, a statistical likelihood that the user's behavioral profile will yield a future customer value in each range. The future time period for which this information may be calculated may be any suitable future time frame, such as the next year, 3 years, 5 years, etc. In the present aspects, the service provider may choose a future time period based upon an accepted tradeoff between the accuracy of the prediction and the importance of having knowledge of information occurring further into the future.

Continuing the aforementioned example of subdividing the customer value into several ranges, Table 1 below provides a summary of four different customer value ranges and their respective statistical likelihoods generated by a predictive modeling function.

TABLE 1

| Customer Value Range | Statistical likelihood of user's customer value being within this customer value range in two years |
|---|---|
| 0-2.5 | 24% |
| 2.6-5.0 | 44% |
| 5.1-7.5 | 83% |
| 7.6-10.0 | 77% |

As shown in Table 1, the output of the predictive modeling function provides different statistical likelihoods for each range of future customer values, with the range of 5.1-7.5 being the highest statistical likelihood. In other words, based upon the various inputs used by the predictive modeling function, such as the user's current behavioral traits and those of other similar users, there is an 83% likelihood that in two years the user's customer value will fall within the range of 5.1-7.5.

In the present aspects, this information may be used to calculate the user's current customer value. Such aspects may be particularly useful if the user's future customer value is of particular importance such that is outweighs the relevance of the user's current customer value. In such a scenario, the user's current customer value may be calculated using a range of values associated with the best statistical likelihood. For example, the range may be averaged and this value may be set as the user's customer value (e.g., 6.3). To provide another example, the user's future customer value may be used in conjunction with the user's current customer value, which may have been calculated without considering future data. For example, the above averaged future customer value of 6.3 may be averaged with the user's current customer value of 8.47, as used in the aforementioned example, to provide a customer value of 7.385. In this way, a service provider may customize how to specify a customer's current value in terms of predicted future information, and how much of this future information to use for these calculations.

Additionally or alternatively, predictive analytics may be used to calculate other types of predictions that may be valuable to the service provider. For example, based upon an analysis of patterns from various user's behavioral profiles, a statistical likelihood may be calculated regarding how likely a particular customer will remain a customer over various time periods. An example of data used in accordance with the present aspects with regards to such calculations is summarized in Table 2 below.

TABLE 2

| Future Time Period | Statistical likelihood of user remaining a customer with the service provider for the future time period |
|---|---|
| 6 months | 90% |
| 1 year | 77% |
| 2 years | 42% |
| 3 years | 15% |

Using this information, a service provider may provide customized incentives in addition to or instead of those related to the customer's value. For example, Table 2 indicates that it is relatively unlikely that a particular user will remain a customer in the next two years. Therefore, the service provider may perform various actions based upon this prediction, such as presenting the user with customized pricing now to attempt to prevent from losing the customer later. To provide another example, the service provider may solicit a special price for the customer conditioned upon the customer signing a two-year contract (or more). In this way, present actions may be taken in an attempt to rectify user behaviors likely to have a negative impact on future profits.

In the present aspects, relationship pricing and incentive calculation module 133 is a portion of memory unit 126 configured to store instructions, that when executed by one or more processors 122, cause one or more processors 122 to perform various acts in accordance with applicable embodiments as described herein. In the present aspects, instructions stored in relationship pricing and incentive calculation module 133 may facilitate one or more processors 122 selecting, identifying, and/or generating a particular promotional campaign for a user based on that user's customer value. Once identified, a user' behavioral profile may be associated with or otherwise linked to a particular promotional campaign, which may include, for example, linking the user to one or more flags, indicators, and/or data stored in any suitable storage device in which the promotional campaign materials are stored or otherwise associated.

For example, a promotional campaign may include any suitable type and/or number of actions undertaken by the service provider in an attempt to maximize profitability. In the present aspects, this may include rewarding customers with a higher customer value more than customers having a lower customer value, as well as attempting to make less valuable customers more profitable. In this way, customer assessment engine 120 not only evaluates customers in terms of their value, but actively monitors their behavior to reward behavioral traits that result in customers being more profitable, while attempting to modify other user behaviors that result in customers being less profitable.

To provide some illustrative examples, promotional campaigns may include a rewards program in which a user is awarded points for specific types of purchases, behaviors, and/or services. These reward points may be calculated such that more valuable customers are provided with more reward points than less valuable customers. To provide another illustrative example, a promotional campaign may include discounted pricing for one or more goods or services provided by the service provider, which may be made available to more valuable customers on a temporary or permanent basis in an attempt to maintain these customers.

In this way, promotional campaigns may aim to leverage each customer's specific value to prioritize maintaining better customers by allocating more funds to more valuable customers. That is, although some incentives may cost the service provider money that would be available without providing the incentives, doing so may provide a greater return on investment by maintaining customers that are already the most profitable, while focusing less promotional campaign funds to less valuable customers. By selectively targeting the most valuable customers in this way, promotional campaigns can be highly focused and more likely to be effective.

In the present aspects, relationship pricing and incentive calculation module 133 may facilitate one or more processors 122 linking a user to one or more promotional campaigns based upon that user's specific customer value. For example, a service provider may assign or otherwise associate discounts, qualifications for certain bundled services, coupons, temporary offers, etc., upon a user reaching specific customer value thresholds. These thresholds may include, for example, quantified customer value scores and/or a specific tier or percentile ranking of a customer's value among other customers. Once such conditions are met, the present aspects include customer assessment engine 120 notifying the customer of any promotional campaigns the customer has been linked to or otherwise qualifies for. For example, once a customer is within the 90th percentile of service provider customer values, that customer may qualify for specific deep discounts not available to other customers. Customer assessment engine 120 may transmit or otherwise send a notification to client device 102 informing the user that such discounts are available, the nature of the discounts, when they expire, how the user may take advantage of the discounts, etc.

In the present aspects, customer incentive evaluation module 135 is a portion of memory unit 126 configured to store instructions, that when executed by one or more processors 122, cause one or more processors 122 to perform various acts in accordance with applicable embodiments as described herein. In the present aspects, instructions stored in customer incentive evaluation module 135 may facilitate one or more processors 122 receiving feedback regarding the effectiveness of one or more promotional campaigns. Additionally or alternatively, instructions stored in customer incentive evaluation module 135 may facilitate one or more processors 122 modifying the selection, identification, and/or specifics associated with one or more promotional campaigns based upon this received feedback.

In the present aspects, customer assessment engine 120 may analyze any suitable number and/or type of feedback regarding the relative success of various promotional campaigns. For example, customer assessment engine 120 may transmit requests to client device 102 soliciting feedback after a user has been notified that she qualifies for a particular promotional campaign. To provide another example, user behavioral traits may be monitored and/or the user's customer value may be periodically calculated and/or tracked. Upon a user being linked to a particular promotional campaign, this information may be analyzed to determine whether the promotional campaign was effective. In the event that the feedback indicates a particular promotional campaign was not effective, the specific thresholds and/or specific incentives associated with the promotional campaign may be modified for that user and/or for similar users (e.g., for other users with matching or similar behavioral profiles).

For example, a user having a customer value within the 90th percentile of all customers may be linked to an initial promotional campaign that provides a 15% discount on prices, and the user may be notified of this qualification. However, 3 months after this offer, the user's behavioral profile may indicate that the user left the service provider for a competitor. After further review, the user's behavioral profile (or other sources of data) may indicate that the competitor's prices were 20% less than the service provider's current offer, and therefore still 5% less than the service provider's incentivized 15% discount. Therefore, even with the 15% discount, the user still saved money by leaving for the competition.

Continuing this example, customer assessment engine 120 may, via one or more processors 122 executing instructions stored in customer incentive evaluation module 135, determine that the 15% discount was inadequate, and increase the discount to 25% moving forward. In the event that other users have behavioral profiles similar to or matching that of the user who recently left for the competition, the service provider may use the updated 25% discount when and if these user's qualify for the same promotional campaign. In this way, customer assessment engine 120 may continually track the effectiveness of various promotional campaigns and dynamically adjust the promotional campaigns offered to valuable customers in an attempt to maintain the most valuable customers over time.

Machine Learning

In certain embodiments, the cognitive computing and predictive modeling application 127 may utilize machine learning techniques. The machine learning techniques may be cognitive learning, deep learning, combined learning, heuristic engines and algorithms, and/or pattern recognition techniques. For instance, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, service provider database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more user device details, user request or login details, user device sensors, geolocation information, image data, a service provider database, a third-party database, and/or other data.

Exemplary Components of Behavioral Profiles

Figure 2:
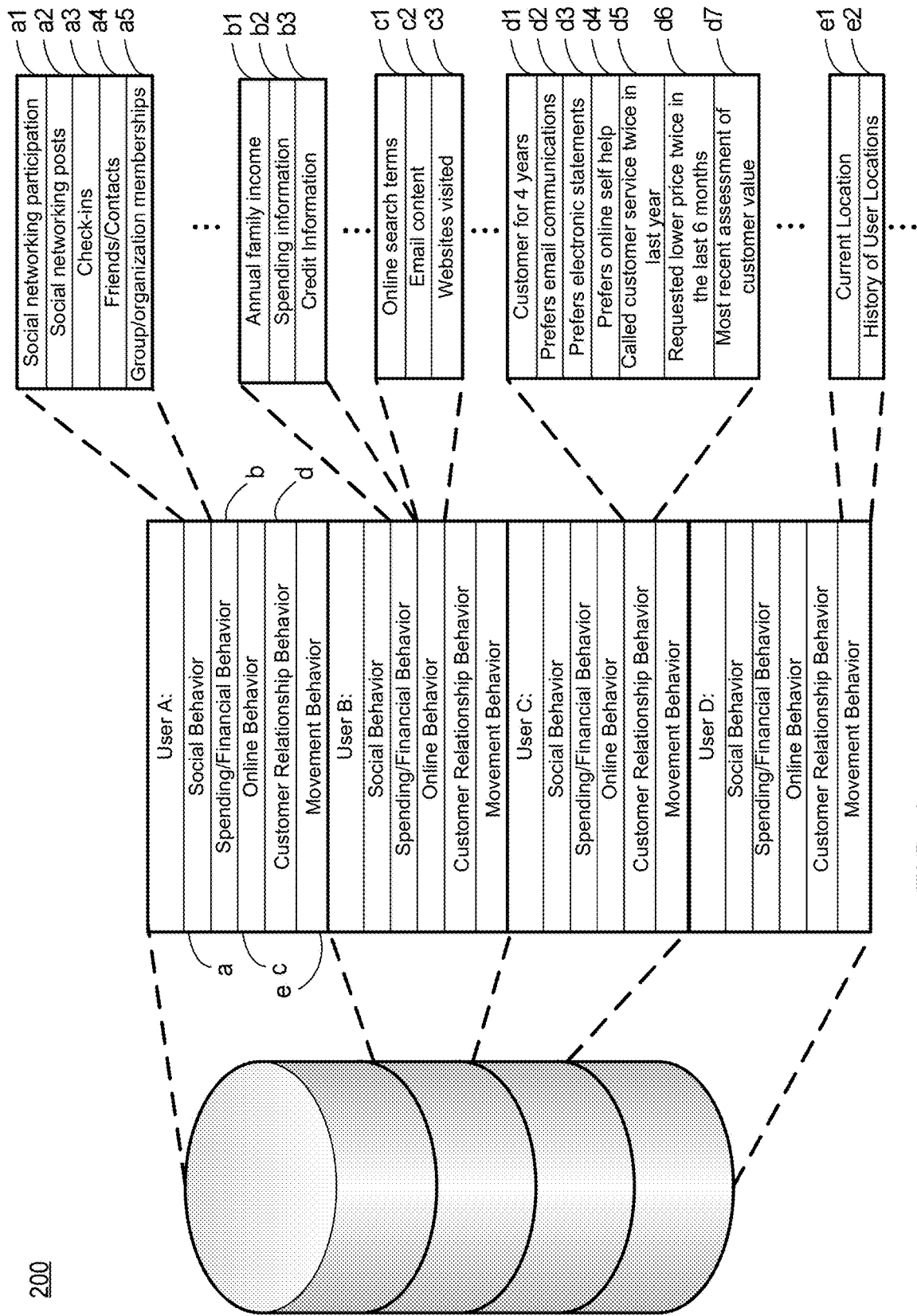
FIG. 2 illustrates exemplary user profiles 200 in accordance with one aspect of the present disclosure.

FIG. 2 illustrates exemplary behavioral profiles 200 in accordance with one aspect of the present disclosure. As shown in FIG. 2, behavioral profiles 200 are an example of the various types of data that may be indicative of behavioral traits, which may be stored in any suitable number of storage units or databases (e.g., storage unit 180, as shown in FIG. 1). Behavioral profiles 200 may be generated, organized, modified, and/or accessed via a customer assessment engine, such as customer assessment engine 120, for example, as shown in FIG. 1.

As shown in FIG. 2, behavioral profiles 200 include a number of different types of collected data associated with a number of individual users A-D. FIG. 2 illustrates four example behavioral profiles including five different types of data. However, the present aspects include behavioral profiles 200 including any suitable number of behavioral profiles for any suitable number of different users, which may be associated with any suitable number and/or type of data in addition to behavioral data.

Behavioral profiles 200 illustrate a number of different types of data associated with each user. Although referred to herein as "behavioral data," the different types of data aggregated as part of each user's behavioral profile may additionally include non-behavioral information about the user as well as other people, such as the user's family members. Again, this behavioral data may be used in accordance with the present aspects to perform calculations and predictions regarding a particular user's customer value.

As shown in FIG. 2, each user's behavioral profile contains different types of information, and portions of each respective type of information may represent user inputs for cognitive computing and predictive modeling application 127. Inputs (a1-a5) may represent data regarding each user's social behavior such as which social networks a user may actively participate in, the details of (e.g., text, images, url links, social networking applications, etc.) associated with a user's social networking activity, online check-ins that the user may post, share, or otherwise indicate via social media, the user's friend and/or contact list from one or more social networks that the individual actively participates, groups and/or organizations (online or offline) that the user may be a member, etc.

Inputs (b1-b3) may represent different types of spending and/or financial data such as, for example, the user's current individual and/or family annual income, spending data (e.g., where the user tends to shop, how much the user typically spends, what the user spends money on, etc.), the user's credit information such as credit card utilization, debt-to-income ratios, credit scores, credit reports, etc.

Inputs (c1-c3) may represent various types of online behavioral data that indicate the user's interaction with various websites, online businesses, and/or other users. For example, online behavior data may represent online data, such as online search terms, the content of email such as various identified key words and their frequency of use, various websites visited by the user such as retailers, competitors of the service provider, etc.

Inputs (d1-d7) may represent different types of information that indicate the user's relationship with the service provider. For example, customer relationship behavior may indicate how long the customer has had an ongoing relationship with the service provider, the customer's preference regarding how to receive communications, the customer's preference for receiving statements or other types of information that may be presented in electronic or paper form, the customer's preference for using customer service, the customer's actual usage of customer service, the medium used by the customer in each case, and the dates and/or frequency such uses, other customer behavior such as requesting lower prices or bundles, what was asked for and when, etc.

Inputs (e1-e2) may represent different types of location data that may indicate the user's current geographic location and/or a history of the user's previous locations. In the present aspects, this location data may be analyzed and/or referenced to other locations known to be associated with a user moving to various locations that may be, for example, associated with referenced geofences. For example, the location data may indicate that the user recently visited physical geographic locations associated with car dealerships, college campuses, physical banks or lender locations, high-end retailers, service provider competitors, etc.

Exemplary Reference Behavioral Profile Matching

Figure 3:
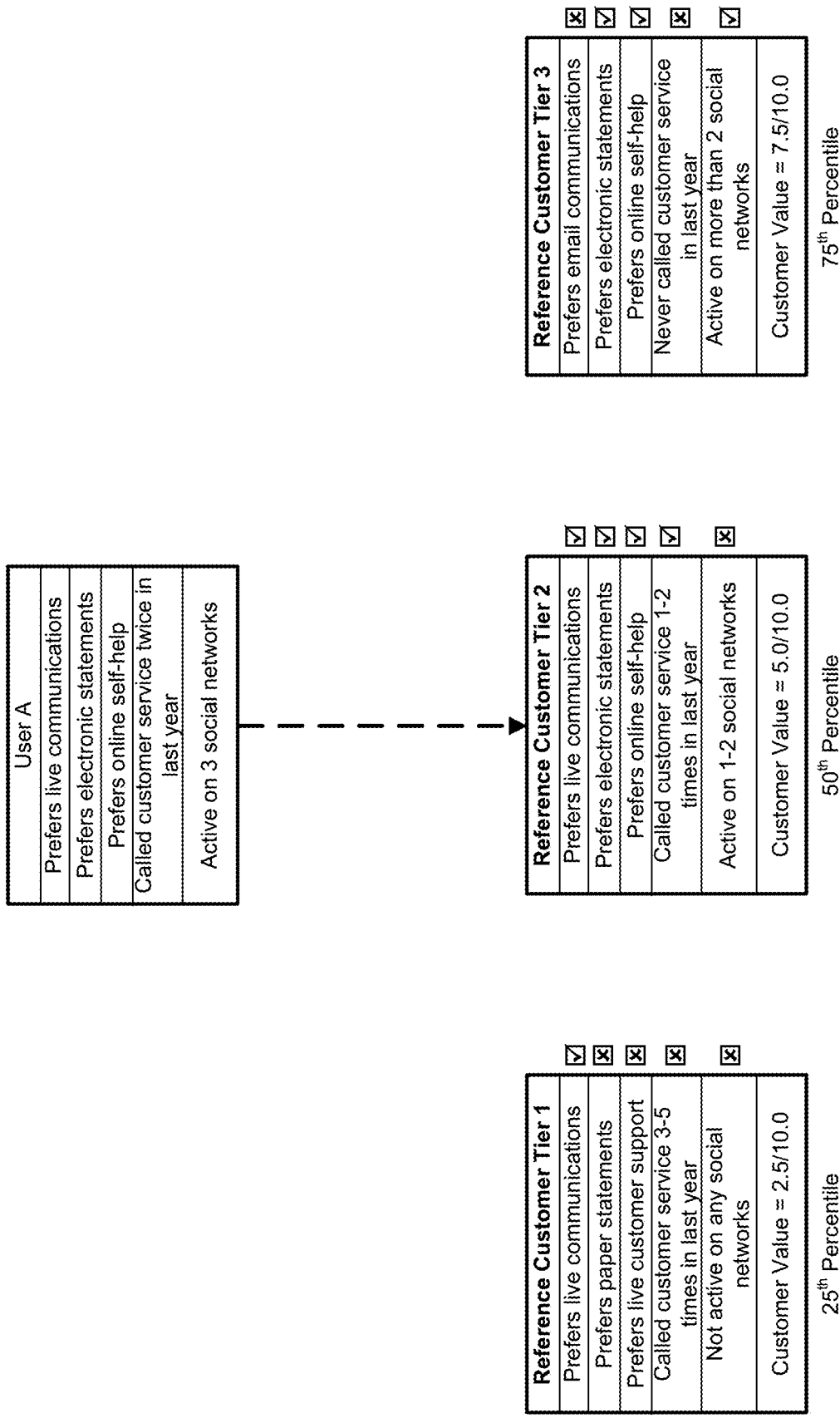
FIG. 3 illustrates an example of reference behavioral profile matching in accordance with one aspect of the present disclosure.

FIG. 3 illustrates an example of reference behavioral profile matching in accordance with one aspect of the present disclosure. FIG. 3 shows behavioral traits included in three different examples of behavioral reference profiles, each being associated with customers of different tiers of known customer values. For example, tier 1 customers may be associated with customers being in the lower 25% of customer values, tier 2 customers may be associated with customers being equal to half of the customer values of other customers, and tier 3 may be associated with customers in the upper 25% of customer values. In other words, as customers are grouped into higher tiers, their customer values are viewed such that the customers are more profitable to the service provider, and therefore are associated with more favorable behavioral traits in terms of service provider profitability.

In the present aspects, a user's customer value may be calculated by determining a matching behavioral profile from among the tiered reference behavioral profiles having the most number of behavioral traits in common with the user's behavioral profile. For brevity, only a few behavioral traits are shown in FIG. 3 and used in this example. However, any suitable number of behavioral traits may be used to match a user with a reference behavioral profile and it may be preferable to use a greater number of behavioral traits to better ensure the accuracy of a match.

Referring to FIG. 3, user A has behavioral traits that include preferences to receiving live communications, receiving electronic statements, and online self-help. Furthermore, user A's behavioral profile also indicates that user A called customer service twice in the last year and is active on three separate social networks. Referencing these behavioral traits to those in each of the tiered reference behavioral profiles, the best match is found, i.e., the tiered reference behavioral profile that has the most number of behavioral traits in common with that of user A's, is the tier 2 reference behavioral profile. Therefore, in this example, a customer value may be calculated for user A to equal that of the tier 2 reference behavioral profile, which is 5.0/10.0.

Of course, each behavioral trait need not be treated equally as part of this matching analysis. For example, matching one behavioral trait may be counted more than once or otherwise weighted to prioritize certain preferable behaviors over others. In the present aspects, any suitable matching system may be used to determine the reference behavioral profile that best matches a user as part of her customer value calculation.

Exemplary Logic Diagram for Promotional Campaign Linking

Figure 4:
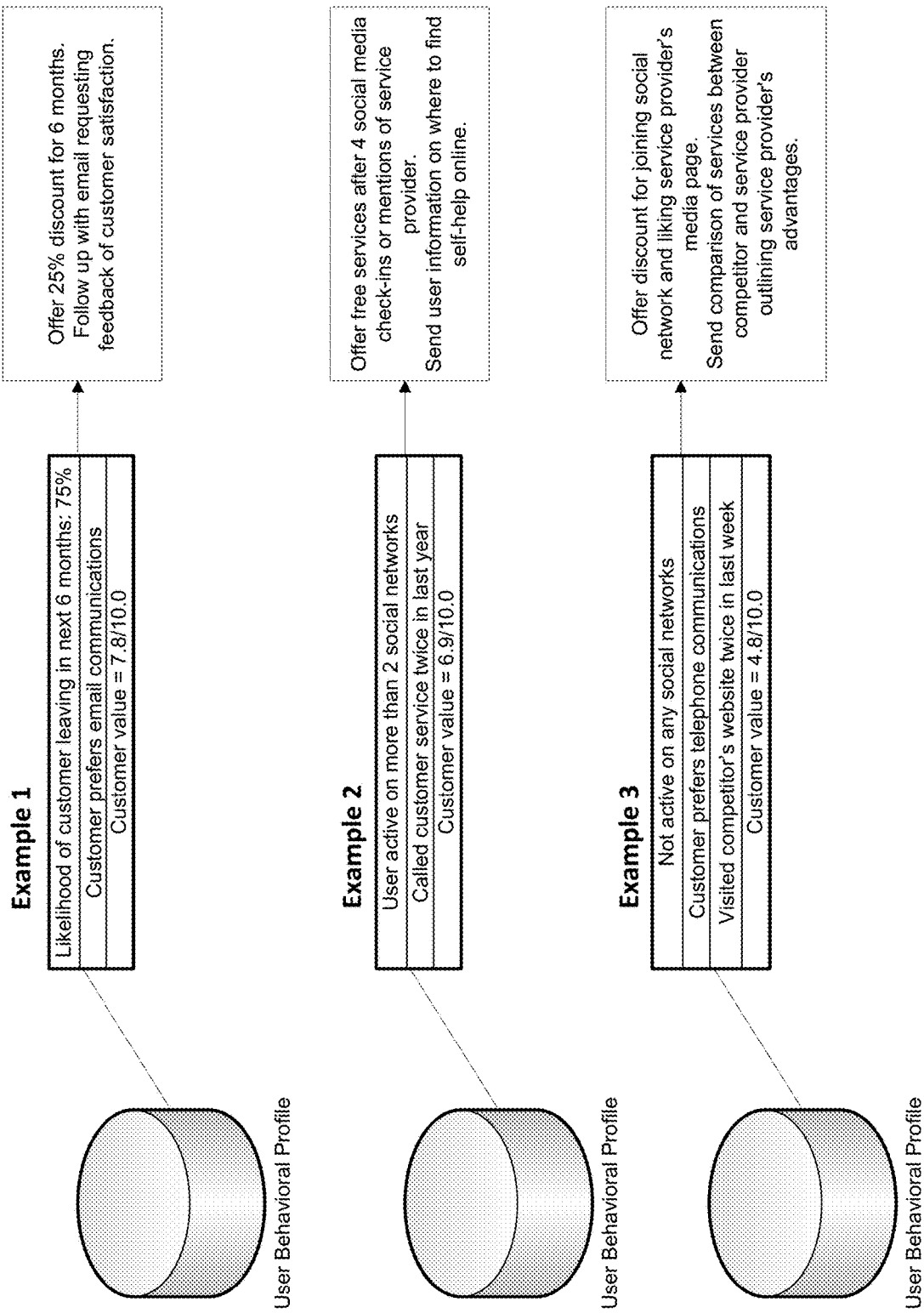
FIG. 4 illustrates exemplary logic diagrams 400 indicating examples of promotional campaign linking based upon a user's behavioral profile, in accordance with an aspect of the present disclosure.

FIG. 4 illustrates logic diagrams 400 indicating examples of promotional campaign linking based upon a user's behavioral profile, in accordance with an aspect of the present disclosure. The behavioral profiles shown in FIG. 4 may be implementations of user profiles 200, for example, as shown in FIG. 2. As shown in FIG. 4, each of examples 1-3 is based upon different portions of a user's behavior. For brevity, the Examples shown in FIG. 4 and described herein illustrate some logical conditions that, when satisfied, may lead to a user exhibiting those behavioral conditions being linked to a specific type of promotional campaign. However, the present aspects include any suitable number of logical conditions being assessed to perform such linking.

To provide an illustrative example, as shown in Example 1 of FIG. 4, a user's behavioral profile may indicate that the user has a high likelihood of leaving within the next 6 months (75%), prefers email communications, and has a relatively high customer value of 7.8/10.0. Therefore, these conditions may cause customer assessment engine 120 to link this user to a promotional campaign that is aimed at maintaining this customer beyond 6 months. To do so, the promotional campaign may offer the user a particularly deep discount of 25%, even if this discount results in a short term loss for the service provider. That is, because this user is particularly profitable, it may be acceptable for the service provider to temporarily lose money provided that the user remains a profitable customer beyond 6 months. The promotional campaign may also include following up with the customer in accordance with the customer's preferred communication channel, i.e., via email, to proactively maintain the relationship and attempt to minimize the future risk of the customer leaving.

To provide another illustrative example, as shown in Example 2 of FIG. 4, a user's behavioral profile may indicate that the user is active on more than two social networks, that the customer called customer service twice in the last year, and that the user is somewhat valuable with a customer value of 6.9/10.0. Therefore, these conditions may cause customer assessment engine 120 to link this user to a promotional campaign that is aimed at improving this customer's value. Because the user is active on several social media networks, then the promotional campaign may do so by requesting that the user check-in to one or more places affiliated with the service provider or by mentioning the service provider by name on their social network page, for example. Therefore, this particular promotional campaign may provide a two-fold benefit for the service provider: it helps to maintain the customer in the event that the customer takes advantage of the offer, and also provides the service provider with additional social media exposure.

Furthermore, because the customer has used customer service twice in the last year but is somewhat technically oriented (i.e., active in online social networks) the user may be unaware of where to find self-help online, otherwise he would utilize it. Therefore, the promotional campaign may also send the customer a message providing this information. In the event that the user uses self-help online versus calling customer service in the future, the customer's value will increase due to the service provider not having to pay for customer service.

To provide another illustrative example, as shown in Example 3 of FIG. 4, a user's behavioral profile may indicate that the user is not active on any social networks, that the customer prefers telephone communications, and that the customer visited a competitor's website twice in the last week. The user's customer value, however, may be relatively low at 4.8/10.0. Therefore, these conditions may cause customer assessment engine 120 to link this user to a promotional campaign that is aimed at improving the user's customer value and informing the user of advantages over the recently-researched competitor.

This may include, for example, sending the user a discount to join a social network and liking the service provider's page supported through that social network. In doing so, customer assessment engine 120 may provide a discount but only by first ensuring that the user increases his customer value somewhat in doing so, all the while giving the service provider additional social media exposure. That is, because this particular customer is not very valuable, a deep discount that loses money for the service provider may not be worth the investment, although a lesser discount, in exchange for more favorable customer behavior, may be.

Furthermore, because the customer has actively engaged in research of a competitor's services, it is likely that the customer is unhappy with the service provider and/or unaware of any advantages the service provider may have over the competition. Therefore, the promotional campaign may additionally include sending the user materials, website links, brochures, etc., pointing out these advantages.

Exemplary Customer Linkage to a Specific Promotional Campaign

Figure 5:
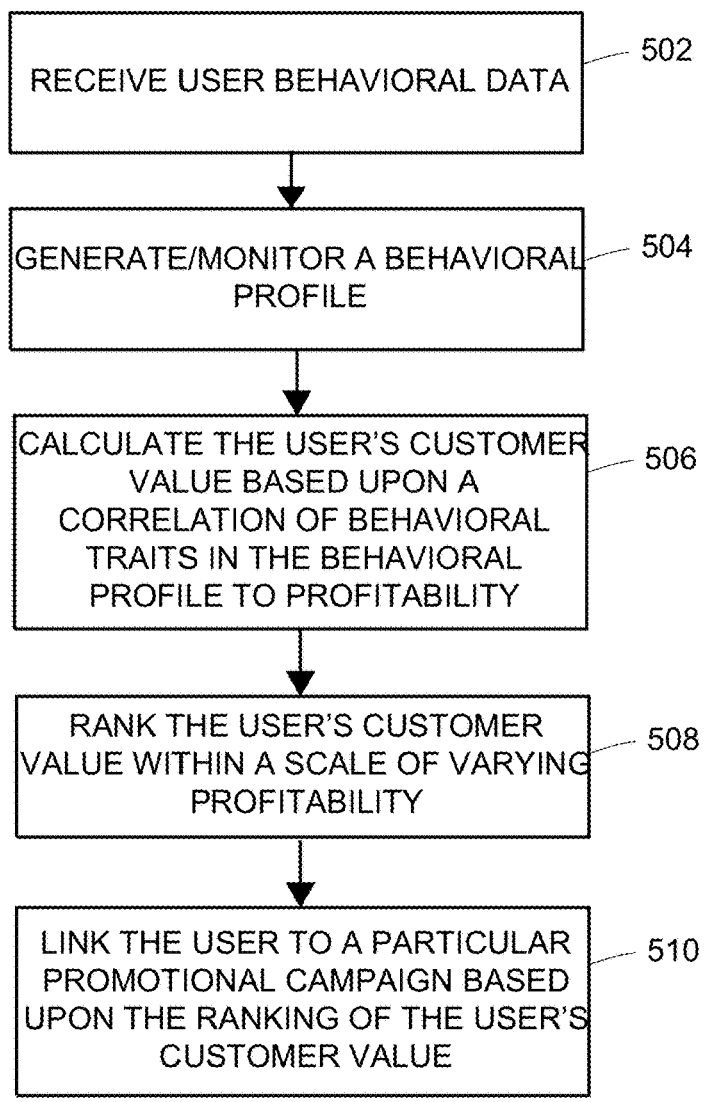
FIG. 5 illustrates an exemplary computer-implemented method flow 500 for improving the functionality of a computer in accordance with one aspect of the present disclosure.

FIG. 5 illustrates an exemplary computer-implemented method flow 500 in accordance with one aspect of the present disclosure. In the present aspects, one or more portions of method 500 (or the entire method 500) may be implemented by any suitable device, and one or more portions of method 500 may be performed by more than one suitable device in combination with one another. For example, one or more portions of method 500 may be performed by client device 102 and/or customer assessment engine 120, as shown in FIG. 1. In one embodiment, method 500 may be performed by any suitable combination of one or more processors, applications, algorithms, and/or routines. For example, method 500 may be performed via one or more processors 122 executing instructions stored in cognitive computing and predictive modeling application 127 in conjunction with data collected, received, and/or generated via customer assessment engine 120, such as user behavioral data discussed herein, for example.

Method 500 may start when one or more processors receive behavioral data (block 502). In the present aspects, the behavioral data may be received from any suitable number and/or type of data sources and may be relevant to the user's relationship with a service provider as a customer. For example, the behavioral data may correspond to data collected via client device 102, one or more financial institutions 150, and/or one or more additional data sources 170, as shown and discussed with reference to FIG. 1.

Method 500 may include one or more processors generating a user behavioral profile based upon the behavioral data (block 504). This may include, for example, a customer assessment engine organizing, aggregating, and/or storing the various different types of behavioral data to a storage unit (block 504). This may also include, for example, a customer assessment engine continuously and/or periodically monitoring the contents of a user's behavioral profile for changes (block 504).

Method 500 may include one or more processors calculating the user's customer value based upon a correlation of behavioral traits in the behavioral profile to the service provider's profitability (block 506). This may include, for example calculating the customer value as a weighted average of behavioral traits based upon each trait's correlation to profitability and the degree of behavior taken by the user with respect to each trait, as discussed herein with reference to FIG. 1 (block 506). This may also include, for example, matching the user's behavioral traits to reference behavioral traits associated with known calculated customer values, and using the matched reference customer value as the user's customer value (block 506). This may further include, for example, using a predicted future customer value, as shown and discussed herein with reference to FIG. 1 (block 506).

Method 500 may include one or more processors ranking the user's customer value within a scale of varying profitability (block 508). This may include, for example, determining where the user's customer value falls among the service providers' other customers, which may include a scaled numeric score, grade, tier, level, percentile, etc., as discussed herein (block 508).

Method 500 may include one or more processors linking the user to a particular promotional campaign based upon the ranking of the user's customer value (block 510). This may include, for example, executing one or more actions to incentivize the customer to remain a customer or otherwise affect the customer's behavior to make the customer more profitable (block 510).

Technical Advantages

The aspects described herein may be implemented as part of one or more computer components such as a client device and/or one or more back-end components, such as a customer assessment engine, for example. Furthermore, the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

For instance, aspects include analyzing various sources of data to determine which promotional campaigns are likely to work for specific customers. In doing so, the aspects overcome issues associated with the inconvenience of manual and/or unnecessary monitoring of user behavior by replacing manual procedures with a cognitive-based computing system. Without the improvements suggested herein, additional processing and memory usage would be required to perform such monitoring and/or to tailor promotional campaigns for users in a specific manner.

Furthermore, the embodiments described herein improve upon existing technologies, and improve the functionality of computers, by more accurately profiling users and forecasting the effectiveness of particular promotional campaigns to attempt to change or maintain certain behaviors. As a result, the customization of promotional campaigns improves the speed, efficiency, and accuracy in which such calculations may be performed. Due to these improvements, the aspects address computer-related issues regarding efficiency over the traditional amount of processing power and models used to calculate promotional campaigns and/or perform data forecasting. Thus, the aspects also address computer related issues that are related to efficiency metrics, such as consuming less power, for example.

Exemplary Computer-Implemented Method for Customizing a Campaign Based Upon a User's Customer Value In one aspect, a computer-implemented method for improving the functionality of a computer and customizing a promotional campaign based upon a customer's value may be provided. The method may include one or more processors (1) receiving user behavioral data associated with a user and indicative of the user's behavior; (2) generating a user behavioral profile for the user based upon the user behavioral data, the user behavioral profile including behavioral traits relevant to the user's role as a customer with a service provider with whom the user has an ongoing relationship; (3) calculating the user's customer value with the service provider by assessing behavioral traits included in the user's behavioral profile and their correlation to a measure of profit for the service provider; (4) ranking the user's customer value within a scale of customer values ranging between a first level of profitability to the service provider and a second level of profitability to the service provider, the first level of profitability being less than the second level of profitability; and/or (5) linking the user to a respective promotional campaign supported by the service provider based upon the ranked user's customer value within the scale of customer values. The method may include additional, less, or alternate actions, including those discussed elsewhere herein For instance, calculating the user's customer value may include assigning a weight to each of the behavioral traits relevant to the user's role as a customer with the service provider, with a greater weight indicating a greater correlation to profitability to the service provider and assigning a numeric value to each of the weighted behavioral traits relevant to the user's role as a customer with the service provider, with a larger numeric value indicating a greater degree of favorable behavior in terms of that particular behavioral trait's tendency to reduce costs for the service provider. The user's customer value may then be calculated as a weighted average of the weighted behavioral traits and their respective numeric values.

Additionally or alternatively, calculating the user's customer value may include accessing a database of tiered reference behavioral profiles including behavioral traits associated with customers of different tiers of known customer values and identifying a matching behavioral profile from among the tiered reference behavioral profiles that has the most number of behavioral traits in common with the user behavioral profile. The user's customer value may then be calculated as the known customer value associated with the matching behavioral profile.

Furthermore, the method may include one or more processors identifying the correlation between behavioral traits included in the user's behavioral profile and the measure of profit for the service provider based upon behavioral traits that were previously correlated with high levels of profitability among the service provider's other customers.

Still further, the method may include subdividing the scale of customer values into a plurality of customer value ranges, and in such a case calculating the user's customer value may include calculating a plurality of outputs from a predictive modeling function, each of the plurality of outputs indicating a different statistical likelihood. Each different statistical likelihood may indicate a probability of the user's customer value, within a future time period, being within a particular one of the plurality of customer value ranges. Using this information, the user's customer value may be calculated as the average of the particular one of the plurality of customer value ranges having the highest statistical likelihood from among the different statistical likelihoods.

The method may also include using any suitable number and/or type of behavioral traits, such as, for example, one or more of (i) the user's spending; (ii) the user's preference to receive information in a paperless manner; (iii) the user's social networking data; (iv) the user's tracked location data; (v) a likelihood that the user will terminate the relationship with the service provider; and (vi) a length of the relationship between the user and the service provider.

Additionally or alternatively, the method may include linking the user to the respective promotional campaign by (i) adjusting rewards program incentives for the user to provide user-specific reward points, the rewards program incentives being associated with a rewards program supported by the service provider; and/or (ii) providing the user with user-specific discounted pricing for one or more services provided by the service provider, such as via wireless communication or data transmission over one or more radio links or wireless communication channels with a user's mobile device.

In another aspect, a computer-implemented method for improving the functionality of a computer or computer system may be provided. The method may include (1) receiving, via one or more processors and/or transceivers, user behavioral data associated with a user and indicative of the user's behavior, such as via wireless communication or data transmission over one or more radio links or wireless communication channels and transmitted from a user mobile device; (2) generating, via the one or more processors, a user behavioral profile for the user based upon the user behavioral data, the user behavioral profile including behavioral traits relevant to the user's role as a customer with a service provider with whom the user has an ongoing relationship; (3) calculating, via the one or more processors, the user's customer value with the service provider by assessing behavioral traits included in the user's behavioral profile and their correlation to a measure of profit for the service provider; (4) ranking, via the one or more processors, the user's customer value within a scale of customer values ranging between a first level of profitability to the service provider and a second level of profitability to the service provider, the first level of profitability being less than the second level of profitability; and/or (5) linking, via the one or more processors, the user to a respective promotional campaign supported by the service provider based upon the ranked user's customer value within the scale of customer values. The method may include additional, less, or alternate actions, including those discussed elsewhere herein.

The computer-implemented method may include the act of linking the user to the respective promotional campaign comprises one or more of: (1) adjusting, via the one or more processors, rewards program incentives for the user to provide user-specific reward points, the rewards program incentives being associated with a rewards program supported by the service provider; and/or (2) providing, via the one or more processors and/or transceivers, the user with user-specific discounted pricing for one or more services provided by the service provider.

The act of linking the user to the respective promotional campaign comprises one or more of: (1) adjusting, via the one or more processors, rewards program incentives for the user to provide user-specific reward points, the rewards program incentives being associated with a rewards program supported by the service provider; (2) generating, via the one or more processors, an electronic message indicating or detailing the rewards program incentives for the user; and/or (3) transmitting, via the one or more processors and/or transceivers, the electronic message to the user's mobile device via wireless communication or data transmission over one or more radio links or wireless communication channels for user review.

Exemplary System for Customizing a Campaign Based Upon a User's Customer Value

In yet another aspect, a computer system for customizing a promotional campaign based upon a customer's value may be provided. The system may include (1) one or more computing devices configured to collect and transmit user behavioral data associated with a user and indicative of the user's behavior, such as via wireless communication or data transmission over one or more radio links or wireless communication channels with a user's mobile device; and (2) one or more back-end components configured to (i) generate a user behavioral profile for the user based upon the user behavioral data, the user behavioral profile including behavioral traits relevant to the user's role as a customer with a service provider with whom the user has an ongoing relationship; (ii) calculate the user's customer value with the service provider by assessing behavioral traits included in the user's behavioral profile and their correlation to a measure of profit for the service provider; (iii) rank the user's customer value within a scale of customer values ranging between a first level of profitability to the service provider and a second level of profitability to the service provider, the first level of profitability being less than the second level of profitability; and/or (iv) link the user to a respective promotional campaign supported by the service provider based upon the ranked user's customer value within the scale of customer values. The system may include additional, less, or alternate components, including those discussed elsewhere herein.

For instance, the one or more back-end components may be further configured to calculate the user's customer value by (i) assigning a weight to each of the behavioral traits relevant to the user's role as a customer with the service provider, with a greater weight indicating a greater correlation to profitability to the service provider; (ii) assigning a numeric value to each of the weighted behavioral traits relevant to the user's role as a customer with the service provider, with a larger numeric value indicating a greater degree of favorable behavior in terms of that particular behavioral trait's tendency to reduce costs for the service provider; and/or (iii) calculating a weighted average of the weighted behavioral traits and their respective numeric values.

Additionally or alternatively, the one or more back-end components may be further configured to calculate the user's customer value by (i) accessing a database of tiered reference behavioral profiles including behavioral traits associated with customers of different tiers of known customer values; (ii) identifying a matching behavioral profile from among the tiered reference behavioral profiles that has the most number of behavioral traits in common with the user behavioral profile; and/or (iii) calculating the user's customer value as the known customer value associated with the matching behavioral profile.

Furthermore, the one or more back-end components may be further configured to identify the correlation between behavioral traits included in the user's behavioral profile and the measure of profit for the service provider based upon behavioral traits that were previously correlated with high levels of profitability among the service provider's other customers.

Still further, the scale of customer values may be subdivided into a plurality of customer value ranges, and the one or more back-end components may be further configured to (i) calculate a plurality of outputs from a predictive modeling function, each of the plurality of outputs indicating a different statistical likelihood, each different statistical likelihood indicates a probability of the user's customer value, within a future time period, being within a particular one of the plurality of customer value ranges; and/or (ii) calculate the user's customer value as the average of the particular one of the plurality of customer value ranges having the highest statistical likelihood from among the different statistical likelihoods.

The system may also utilize any suitable number and/or type of behavioral traits including, for example, one or more of (i) the user's spending; (ii) the user's preference to receive information in a paperless manner; (iii) the user's social networking data; (iv) the user's tracked location data; (v) a likelihood that the user will terminate the relationship with the service provider; and/or (vi) a length of the relationship between the user and the service provider.

Additionally or alternatively, the one or more back-end components may be further configured to link the user to the respective promotional campaign by, performing one or more of (i) adjusting rewards program incentives for the user to provide user-specific reward points, the rewards program incentives being associated with a rewards program supported by the service provider; and (ii) providing the user with user-specific discounted pricing for one or more services provided by the service provider, such as via wireless communication or data transmission over one or more radio links or wireless communication channels sent to a user's mobile device.

Exemplary Non-Transitory Tangible Computer-Readable Medium for Customizing a Campaign Based Upon a User's Customer Value In still another aspect, a non-transitory tangible computer-readable medium for customizing a campaign based upon a user's customer value may be provided. The non-transitory tangible computer-readable medium may include instructions executable by one or more processors that, when executed by the one or more processors, causes the one or more processors to (1) receive user behavioral data associated with a user and indicative of the user's behavior, such as via wireless communication or data transmission over one or more radio links or wireless communication channels sent from a user's mobile device; (2) generate a user behavioral profile for the user based upon the user behavioral data, the user behavioral profile including behavioral traits relevant to the user's role as a customer with a service provider with whom the user has an ongoing relationship; (3) calculate the user's customer value with the service provider by assessing behavioral traits included in the user's behavioral profile and their correlation to a measure of profit for the service provider; (4) rank the user's customer value within a scale of customer values ranging between a first level of profitability to the service provider and a second level of profitability to the service provider, the first level of profitability being less than the second level of profitability; and/or (5) link the user to a respective promotional campaign supported by the service provider based upon the ranked user's customer value within the scale of customer values. The non-transitory tangible computer-readable medium may include additional, less, or alternate instructions, including those discussed elsewhere herein.

For instance, the instructions may cause the one or more processors to calculate the user's customer value by (i) assigning a weight to each of the behavioral traits relevant to the user's role as a customer with the service provider, with a greater weight indicating a greater correlation to profitability to the service provider; (ii) assigning a numeric value to each of the weighted behavioral traits relevant to the user's role as a customer with the service provider, with a larger numeric value indicating a greater degree of favorable behavior in terms of that particular behavioral trait's tendency to reduce costs for the service provider; and/or (iii) calculating the customer's value as a weighted average of the weighted behavioral traits and their respective numeric values.

Additionally or alternatively, the instructions may cause the one or more processors to calculate the user's customer value by (i) accessing a database of tiered reference behavioral profiles including behavioral traits associated with customers of different tiers of known customer values; (ii) identifying a matching behavioral profile from among the tiered reference behavioral profiles that has the most number of behavioral traits in common with the user behavioral profile; and/or (iii) calculating the user's customer value as the known customer value associated with the matching behavioral profile.

Furthermore, the instructions may cause the one or more processors to identify the correlation between behavioral traits included in the user's behavioral profile and the measure of profit for the service provider based upon behavioral traits that were previously correlated with high levels of profitability among the service provider's other customers.

Still further, the scale of customer values may be subdivided into a plurality of customer value ranges, and the instructions may cause the one or more processors to (i) calculate a plurality of outputs from a predictive modeling function, each of the plurality of outputs indicating a different statistical likelihood, each different statistical likelihood indicates a probability of the user's customer value, within a future time period, being within a particular one of the plurality of customer value ranges; and/or (ii) calculate the user's customer value as the average of the particular one of the plurality of customer value ranges having the highest statistical likelihood from among the different statistical likelihoods.

The instructions may cause the one or more processors to utilize any suitable number and/or type of behavioral traits including, for example, one or more of (i) the user's spending; (ii) the user's preference to receive information in a paperless manner; (iii) the user's social networking data; (iv) the user's tracked location data; (v) a likelihood that the user will terminate the relationship with the service provider; and (vi) a length of the relationship between the user and the service provider.

Additionally or alternatively, the instructions may cause the one or more processors to link the user to the respective promotional campaign by, performing one or more of (i) adjusting rewards program incentives for the user to provide user-specific reward points, the rewards program incentives being associated with a rewards program supported by the service provider; and (ii) providing the user with user-specific discounted pricing for one or more services provided by the service provider, such as via wireless communication or data transmission over one or more radio links or wireless communication channels sent to a user's mobile device for user review or use of the discounted pricing.

Additional Considerations

This detailed description is to be construed as exemplary only and does not describe every possible embodiment, as describing every possible embodiment would be impractical, if not impossible. One may be implement numerous alternate embodiments, using either current technology or technology developed after the filing date of this application.

Further to this point, although the embodiments described herein often utilize credit report information as an example of sensitive information; the embodiments described herein are not limited to such examples. Instead, the embodiments described herein may be implemented in any suitable environment in which it is desirable to identify and control specific type of information. For example, the aforementioned embodiments may be implemented by a financial institution to identify and contain bank account statements, brokerage account statements, tax documents, etc. To provide another example, the aforementioned embodiments may be implemented by a lender to not only identify, re-route, and quarantine credit report information, but to apply similar techniques to prevent the dissemination of loan application documents that are preferably delivered to a client for signature in accordance with a more secure means (e.g., via a secure login to a web server) than via email.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method, comprising:
    training, by one or more processors, a cognitive computing machine learning model using historical data associated with:
        a set of behavioral traits associated with a set of customers; and
        a service provider value metric associated with a service provider,
            wherein the training includes determining one or more correlations between one or more behavioral traits in the set of behavioral traits and the service provider value metric;
    receiving, by the one or more processors, user behavioral data associated with a user;
    generating, by the one or more processors, a user behavioral profile associated with the user and based upon the user behavioral data, the user behavioral profile indicating one or more user behavioral traits of the user;
    determining, by the one or more processors, a customer value of the user to the service provider, based at least in part on at least one correlation, of the one or more correlations, between with the one or more user behavioral traits and the service provider value metric;
    ranking, by the one or more processors, the customer value at a position within a scale of customer values ranging between a first level of value to the service provider and a second level of value to the service provider, the first level of value being less than the second level of value; and
    associating, by the one or more processors, the user behavioral profile to a promotional campaign of the service provider, wherein the promotional campaign is associated with the position of the customer value within the scale of customer values.

2. The computer-implemented method of claim 1, wherein determining the customer value comprises:
    assigning, by the one or more processors, weights to individual user behavioral traits of the one or more user behavioral traits, based on the one or more correlations determined by training the cognitive computing machine learning model;
    assigning, by the one or more processors, numeric values to the individual user behavioral traits of the one or more user behavioral traits, based at least in part on indications in the user behavioral profile of how often the user exhibits the individual user behavioral traits; and
    determining, by the one or more processors, the customer value as a weighted average based on the weights and the numeric values assigned to the one or more user behavioral traits.

3. The computer-implemented method of claim 1, wherein determining the customer value comprises:
    accessing, by the one or more processors, a database of tiered reference behavioral profiles indicating sets of user behavioral traits associated with customers of different tiers of known customer values;
    identifying, by the one or more processors, a matching reference behavioral profile from among the tiered reference behavioral profiles that has a highest number of user behavioral traits in common with the user behavioral profile; and
    determining, by the one or more processors, the customer value based at least in part on a known customer value associated with the matching reference behavioral profile.

4. The computer-implemented method of claim 1, wherein the scale of customer values is subdivided into a plurality of customer value ranges, and wherein determining the customer value comprises:

determining, by the one or more processors, a plurality of outputs from a predictive modeling function, each of the plurality of outputs indicating a different statistical likelihood of a future customer value associated with the user being within a corresponding customer value range of the plurality of customer value ranges; and determining, by the one or more processors, the customer value based at least in part on an average of a set of customer values within a particular one of the plurality of customer value ranges that has a highest statistical likelihood associated with the future customer value from among the different statistical likelihoods.

5. The computer-implemented method of claim 1, wherein the one or more user behavioral traits indicated in the user behavioral profile includes one or more of (i) spending data associated with the user; (ii) a preference of the user to receive information in a paperless manner; (iii) social networking data associated with the user; (iv) tracked location data associated with the user; (v) a likelihood that the user will terminate an ongoing relationship with the service provider; and (vi) a length of the ongoing relationship between the user and the service provider.

6. The computer-implemented method of claim 1, wherein linking the user to the promotional campaign comprises one or more of:

adjusting, by the one or more processors, rewards program incentives for the user to provide user-specific reward points, the rewards program incentives being associated with a rewards program supported by the service provider; and causing, by the one or more processors, the user to be provided with user-specific discounted pricing for one or more services provided by the service provider.

7. A system, comprising:

one or more processors;

memory storing computer-executable instructions that, when executed by the one or more processors, cause the one or more processors to perform operations comprising:

training a cognitive computing machine learning model using historical behavior data associated with:
a set of behavioral traits associated with a set of customers; and
a service provider value metric associated with a service provider,
wherein the training includes determining one or more correlations between one or more behavioral traits in the set of behavioral traits and the service provider value metric;

receiving user behavioral data associated with a user;

generating a user behavioral profile associated with the user and based upon the user behavioral data, the user behavioral profile indicating one or more user behavioral traits of the user;

determining a customer value of the user to the service provider, based at least in part on at least one correlation, of the one or more correlations, between the one or more user behavioral traits and the service provider value metric;

ranking the customer value at a position within a scale of customer values ranging between a first level of value to the service provider and a second level of value to the service provider, the first level of value being less than the second level of value; and associating the user behavioral profile to a promotional campaign of the service provider, wherein the promotional campaign is associated with the position of the customer value within the scale of customer values.

8. The system of claim 7, wherein determining the customer value comprises:

assigning weights to individual user behavioral traits of the one or more user behavioral traits, based on the one or more correlations determined by training the cognitive computing machine learning model;

assigning numeric values to the individual user behavioral traits of the one or more user behavioral traits, based at least in part on indications in the user behavioral profile of how often the user exhibits the individual user behavioral traits; and determining the customer value as a weighted average based on the weights and the numeric values assigned to the one or more user behavioral traits.

9. The system of claim 7, wherein determining the customer value comprises:

accessing a database of tiered reference behavioral profiles indicating sets of user behavioral traits associated with customers of different tiers of known customer values;

identifying a matching reference behavioral profile from among the tiered reference behavioral profiles that has a highest number of user behavioral traits in common with the user behavioral profile; and determining the customer value based at least in part on a known customer value associated with the matching reference behavioral profile.

10. The system of claim 7, wherein the scale of customer values is subdivided into a plurality of customer value ranges, and wherein determining the customer value comprises:

determining a plurality of outputs from a predictive modeling function, each of the plurality of outputs indicating a different statistical likelihood of a future customer value associated with the user being within a corresponding customer value range of the plurality of customer value ranges; and determining the customer value based at least in part on an average of a set of customer values within a particular one of the plurality of customer value ranges that has a highest statistical likelihood associated with the future customer value from among the different statistical likelihoods.

11. The system of claim 7, wherein the one or more user behavioral traits indicated in the user behavioral profile includes one or more of (i) spending data associated with the user; (ii) a preference of the user to receive information in a paperless manner; (iii) social networking data associated with the user; (iv) tracked location data associated with the user; (v) a likelihood that the user will terminate an ongoing relationship with the service provider; and (vi) a length of the ongoing relationship between the user and the service provider.

12. The system of claim 7, wherein linking the user to the promotional campaign comprises one or more of:

adjusting rewards program incentives for the user to provide user-specific reward points, the rewards program incentives being associated with a rewards program supported by the service provider; and causing the user to be provided with user-specific discounted pricing for one or more services provided by the service provider.

13. A non-transitory, tangible computer-readable medium storing instructions thereon that, when executed by one or more processors, cause the one or more processors to:

train a cognitive computing machine learning model using historical behavior data associated with:
    a set of behavioral traits associated with a set of customers; and
    a service provider value metric associated with a service provider,
    wherein the training includes determining one or more correlations between one or more behavioral traits in the set of behavioral traits and service provider value metric;
receive user behavioral data associated with a user;
generate a user behavioral profile associated with the user and based upon the user behavioral data, the user behavioral profile indicating one or more user behavioral traits of to the user;
determine a customer value of the user to the service provider, based at least in part on at least one correlation, of the one or more correlations, between the one or more user behavioral traits and the service provider value metric;
rank the customer value at a position within a scale of customer values ranging between a first level of value to the service provider and a second level of value to the service provider, the first level of value being less than the second level of value; and
associate the user behavioral profile to a promotional campaign of the service provider, wherein the promotional campaign is associated with the position of the customer value within the scale of customer values.

14. The non-transitory, tangible computer-readable medium of claim 13, wherein the instructions cause the one or more processors to determine the customer value by:
    assigning weights to individual user behavioral traits of the one or more user behavioral traits, based on the one or more correlations determined by training the cognitive computing machine learning model;
    assigning numeric values to the individual user behavioral traits of the one or more user behavioral traits, based at least in part on indications in the user behavioral profile of how often the user exhibits the individual user behavioral traits; and
    determining the customer value as a weighted average based on the weights and the numeric values assigned to the one or more user behavioral traits.

15. The non-transitory, tangible computer-readable medium of claim 13, wherein the instructions cause the one or more processors to determine the customer value by:
    accessing a database of tiered reference behavioral profiles indicating sets of user behavioral traits associated with customers of different tiers of known customer values;
    identifying a matching reference behavioral profile from among the tiered reference behavioral profiles that has a highest number of user behavioral traits in common with the user behavioral profile; and
    determining the customer value based at least in part on known customer value associated with the matching reference behavioral profile.

16. The non-transitory, tangible computer-readable medium of claim 13, wherein the scale of customer values is subdivided into a plurality of customer value ranges, and wherein the instructions cause the one or more processors to determine the customer value by:
    determining a plurality of outputs from a predictive modeling function, each of the plurality of outputs indicating a different statistical likelihood of a future customer value associated with the user being within a corresponding customer value range of the plurality of customer value ranges; and
    determining the customer value based at least in part on an average of a set of customer values within a particular one of the plurality of customer value ranges that has a highest statistical likelihood associated with the future customer value from among the different statistical likelihoods.

17. The non-transitory, tangible computer-readable medium of claim 13, wherein the one or more user behavioral traits indicated in the user behavioral profile includes one or more of (i) spending data associated with the user; (ii) a preference of the user to receive information in a paperless manner; (iii) social networking data associated with the user; (iv) tracked location data associated with the user; (v) a likelihood that the user will terminate an ongoing relationship with the service provider; and (vi) a length of the ongoing relationship between the user and the service provider.

18. The non-transitory, tangible computer-readable medium of claim 13, wherein the instructions cause the one or more processors to link the user to the promotional campaign by:
    adjusting rewards program incentives for the user to provide user-specific reward points, the rewards program incentives being associated with a rewards program supported by the service provider; and
    causing the user to be provided with user-specific discounted pricing for one or more services provided by the service provider.

19. The computer-implemented method of claim 4, wherein determining the customer value further comprises averaging, by the one or more processors, (i) the average of the set of customer values within the particular one of the plurality of customer value ranges with (ii) a current customer value associated with the user.

20. The system of claim 10, wherein determining the customer value further comprises averaging (i) the average of the set of customer values within the particular one of the plurality of customer value ranges with (ii) a current customer value associated with the user.

21. The non-transitory, tangible computer-readable medium of claim 16, wherein the instructions cause the one or more processors to further determine the customer value by averaging (i) the average of the set of customer values within the particular one of the plurality of customer value ranges with (ii) a current customer value associated with the user.

* * * * *